US011453496B1

(12) United States Patent
Notteboom et al.

(10) Patent No.: US 11,453,496 B1
(45) Date of Patent: Sep. 27, 2022

(54) PACKAGE DELIVERY SYSTEMS AND METHODS FOR AERIAL VEHICLES

(71) Applicant: Amazon Technologies, Inc., Seattle, WA (US)

(72) Inventors: Cyriel Notteboom, Seattle, WA (US); Nathan Stuart Friendly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 424 days.

(21) Appl. No.: 16/666,172

(22) Filed: Oct. 28, 2019

(51) Int. Cl.
| | |
|---|---|
| *B64C 1/14* | (2006.01) |
| *B64D 1/02* | (2006.01) |
| *B64C 39/02* | (2006.01) |
| *B64D 9/00* | (2006.01) |
| *E05C 3/12* | (2006.01) |

(52) U.S. Cl.
CPC .............. *B64D 1/02* (2013.01); *B64C 1/1415* (2013.01); *B64C 39/024* (2013.01); *B64D 9/00* (2013.01); *E05C 3/12* (2013.01); *B64C 2201/027* (2013.01); *B64C 2201/042* (2013.01); *B64C 2201/128* (2013.01)

(58) Field of Classification Search
CPC .... B64C 1/1415; B64C 2201/128; B64D 1/12
See application file for complete search history.

(56) References Cited

U.S. PATENT DOCUMENTS

| | | | | |
|---|---|---|---|---|
| 2,942,812 | A * | 6/1960 | Pauli | B64C 1/1415 296/61 |
| 3,021,164 | A * | 2/1962 | Weaver | E05B 65/0021 70/483 |
| 5,755,582 | A * | 5/1998 | Charlton | H02G 3/185 439/131 |
| 2005/0121918 | A1* | 6/2005 | Smock | E05B 17/0029 292/109 |
| 2016/0059963 | A1* | 3/2016 | Burgess | B64D 9/00 701/49 |
| 2020/0062399 | A1* | 2/2020 | Prager | B64D 1/10 |
| 2021/0371129 | A1* | 12/2021 | Masuoka | B64D 1/22 |

* cited by examiner

*Primary Examiner* — Magdalena Topolski
*Assistant Examiner* — Shanna Danielle Glover
(74) *Attorney, Agent, or Firm* — Athorus, PLLC

(57) ABSTRACT

A package delivery apparatus of a vehicle may include a servo, a servo arm rotated by the servo, a latch that rotates responsive to rotation of the servo arm, and a rod and slider that moves responsive to rotation of the servo arm. The components of the package delivery apparatus may move between a plurality of positions, including a loading position, a locking position, a sensing position, and a release position. The rotation of the latch may control loading, locking, sensing, and release of a package within a package path of the vehicle, and the movement of the rod and slider may control movement of a door assembly of the vehicle between open and closed positions.

20 Claims, 18 Drawing Sheets

PACKAGE DELIVERY SYSTEMS AND METHODS FOR AERIAL VEHICLES

BACKGROUND

Unmanned vehicles, such as unmanned aerial vehicles, ground based vehicles, and water based vehicles, are continuing to increase in use. For example, unmanned aerial vehicles are often used by hobbyists to obtain aerial images of buildings, landscapes, etc. Likewise, unmanned ground based vehicles are often used in materials handling facilities to autonomously transport inventory within the facility. In addition, unmanned vehicles, such as unmanned aerial vehicles, ground based vehicles, and water based vehicles, may be used for delivery services. Accordingly, there is a need for lightweight, reliable, and robust package delivery systems to facilitate delivery services by unmanned vehicles.

DETAILED DESCRIPTION

Figure 1:
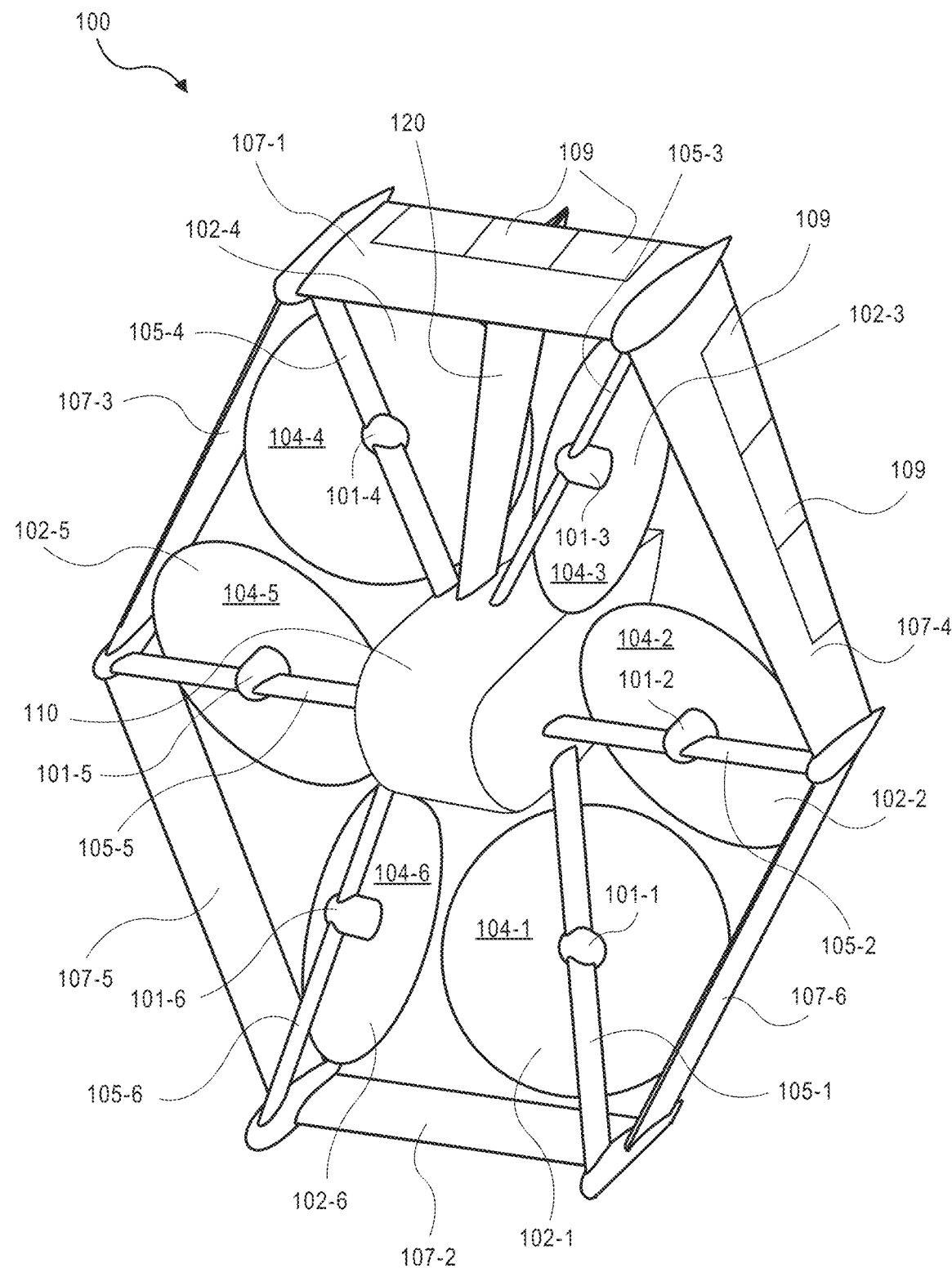
FIG. 1 illustrates a schematic perspective view diagram of an aerial vehicle with a ring wing that is substantially hexagonal in shape and that surrounds a plurality of propulsion mechanisms, in accordance with implementations of the present disclosure.

As is set forth in greater detail below, implementations of the present disclosure are directed to a package delivery system or apparatus configured to receive or load, lock, sense, and release a package with respect to a vehicle. For example, the vehicle may be an unmanned aerial vehicle that receives or loads, locks, and senses the package, and then navigates to a delivery location to release the package. In other example embodiments, the vehicle may be a ground based vehicle, water based vehicle, or other types of vehicles.

In example embodiments, an unmanned aerial vehicle may include a fuselage, one or more propulsion mechanisms, and a package delivery system or apparatus. The package delivery apparatus may be coupled to a portion of the fuselage of the vehicle. In addition, the package delivery apparatus may include a package door hingedly coupled to the fuselage of the vehicle, a bracket coupled to an interior of the fuselage, a servo or other actuator coupled to the bracket, a servo arm coupled to and rotated by the servo, a latch rotatably coupled to the bracket and configured to move between a plurality of positions responsive to rotation by the servo arm, and a rod pivotably coupled between the servo arm and the package door and configured to move the package door between an open position and a closed position responsive to movement by the servo arm.

The servo, servo arm, latch, and rod may move between a plurality of positions, including a loading position, a locking position, a sensing position, and a release position. For example, in the loading position, the servo and servo arm may rotate to contact a foot of the latch, a shoulder of the latch may movably obstruct a portion of a package path, and the rod may be positioned such that the package door may be movable between the open position and the closed position. In the locking position, the servo and servo arm may rotate to contact a mouth of the latch, a shoulder of the latch may obstruct a portion of the package path, and the rod may be positioned such that the package door is held in the closed position. In the sensing position, the servo and servo arm may rotate to contact at least a portion of a channel of the latch, a finger of the latch may enter a portion of the package path, and the rod may be positioned such that the package door is held in the closed position. In the release position, the servo and servo arm may rotate to contact a mouth of the latch, the package path may be unobstructed by the latch, and the rod may be positioned such that the package door is held in the open position.

The package delivery apparatus described herein may be designed and configured such that only a single servo or actuator may be used to control loading, locking, sensing, and release of a package via interactions or interconnections between the servo arm and the rotatable latch, and also to control movement of the package door between an open position and a closed position via interactions or interconnections between the servo arm and the movable rod.

Further, in the locking position, the servo arm, latch, and rod, and their respective interactions or interconnections, may be configured such that forces, torques or pressure exerted upon the latch, e.g., by a loaded package, do not backdrive the servo, and forces, torques or pressure exerted upon the package door and the rod connected thereto, e.g., by wind or external forces or torques, also do not backdrive the servo. Moreover, in the release position, the servo arm and rod, and their respective interactions or interconnections, may be configured such that forces, torques or pressure exerted upon the package door and the rod connected thereto, e.g., by wind or external forces or torques, also do not backdrive the servo.

Using the package delivery apparatus described herein, a package may be loaded, locked, sensed, and released by a vehicle, such as an unmanned aerial vehicle, and the package delivery apparatus described herein may comprise a lightweight, reliable, and robust apparatus using only a single servo or actuator to control operations with respect to both a package and a package door concurrently.

FIG. 1 illustrates a schematic perspective view diagram of an aerial vehicle 100 with a ring wing that is substantially hexagonal in shape and that surrounds a plurality of propulsion mechanisms, according to disclosed implementations. The aerial vehicle 100 includes six propulsion mechanisms 102-1, 102-2, 102-3, 102-4, 102-5, and 102-6 spaced about the fuselage 110 of the aerial vehicle 100. While the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the motor arm extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, and/or aluminum.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
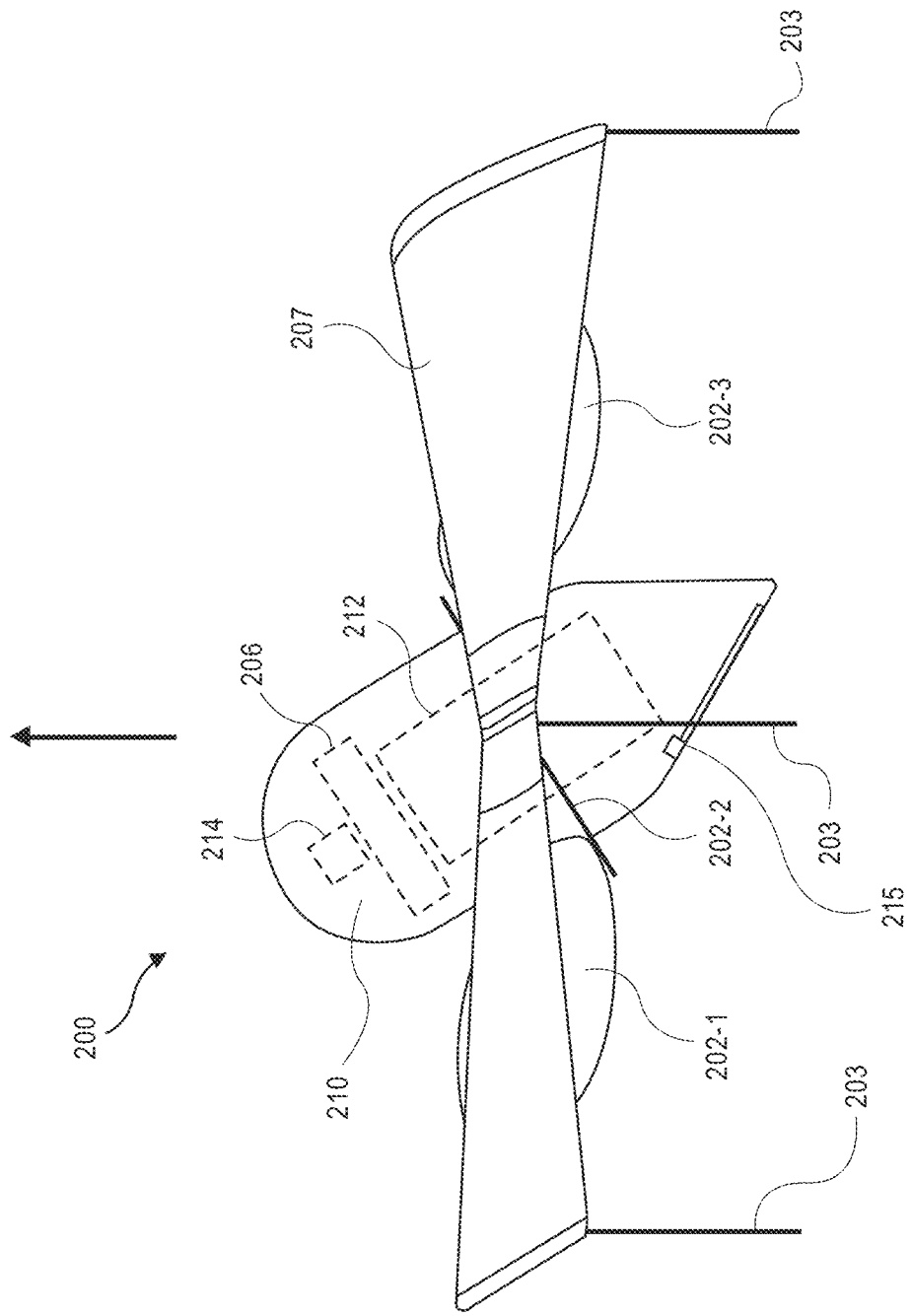
FIG. 2 illustrates a schematic side view diagram of the aerial vehicle of FIG. 1 oriented for vertical takeoff and landing (VTOL), in accordance with implementations of the present disclosure.

FIG. 2 illustrates a schematic side view diagram of the aerial vehicle 200 oriented for vertical takeoff and landing (VTOL), in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the aerial vehicle, such as the aerial vehicle control system 214, a power module 206, and/or a payload 212 that is transported by the aerial vehicle. In addition, the fuselage 210 may also include a payload or package delivery apparatus 215 configured to load, lock, sense, and release the package or payload 212. The aerial vehicle control system is discussed further below at least with respect to FIG. 13. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, and the package delivery apparatus 215.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The package or payload 212 may be any payload that is to be transported by the aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer specified delivery location using the aerial vehicle 200. In example embodiments, the package or payload 212 may be shaped as a substantially rectangular prism, such as a box, container, crate, or other package.

In example implementations, the fuselage 210 may include a package delivery system or apparatus 215 that is coupled to a portion of the fuselage 210. For example, the package delivery apparatus 215 may include a package door, a bracket, a servo or other actuator, a servo arm, a latch configured to load, lock, sense, and release the package, and a rod configured to move the package door between an open position and a closed position. Further details of the package delivery apparatus 215 are discussed further below.

In addition, a package or payload 212 may be loaded and released via a package path that is configured to cooperate with portions of the package delivery apparatus 215 to receive, lock, sense, and release a package. For example, the package path may comprise one or more rails, guides, brackets, surfaces, or other guidance or alignment elements that may receive, lock, sense, and release a package within the fuselage 210. In one example embodiment, the package path may comprise four or more planar surfaces, guides, or rails that interface with four sides of a rectangular package that may be received within the fuselage 210. In another example embodiment, the package path may comprise four angled or L-shaped brackets, guides, or rails that interface with four corners of a rectangular package that may be received within the fuselage 210. Other numbers and configurations of rails, guides, brackets, surfaces, or other guidance or alignment elements may be used to form a package path to receive, lock, sense, and release a package within the fuselage 210, and various example package paths may be sized to receive, lock, sense, and release packages of desired shapes and sizes within a fuselage of a vehicle.

Figure 3A:
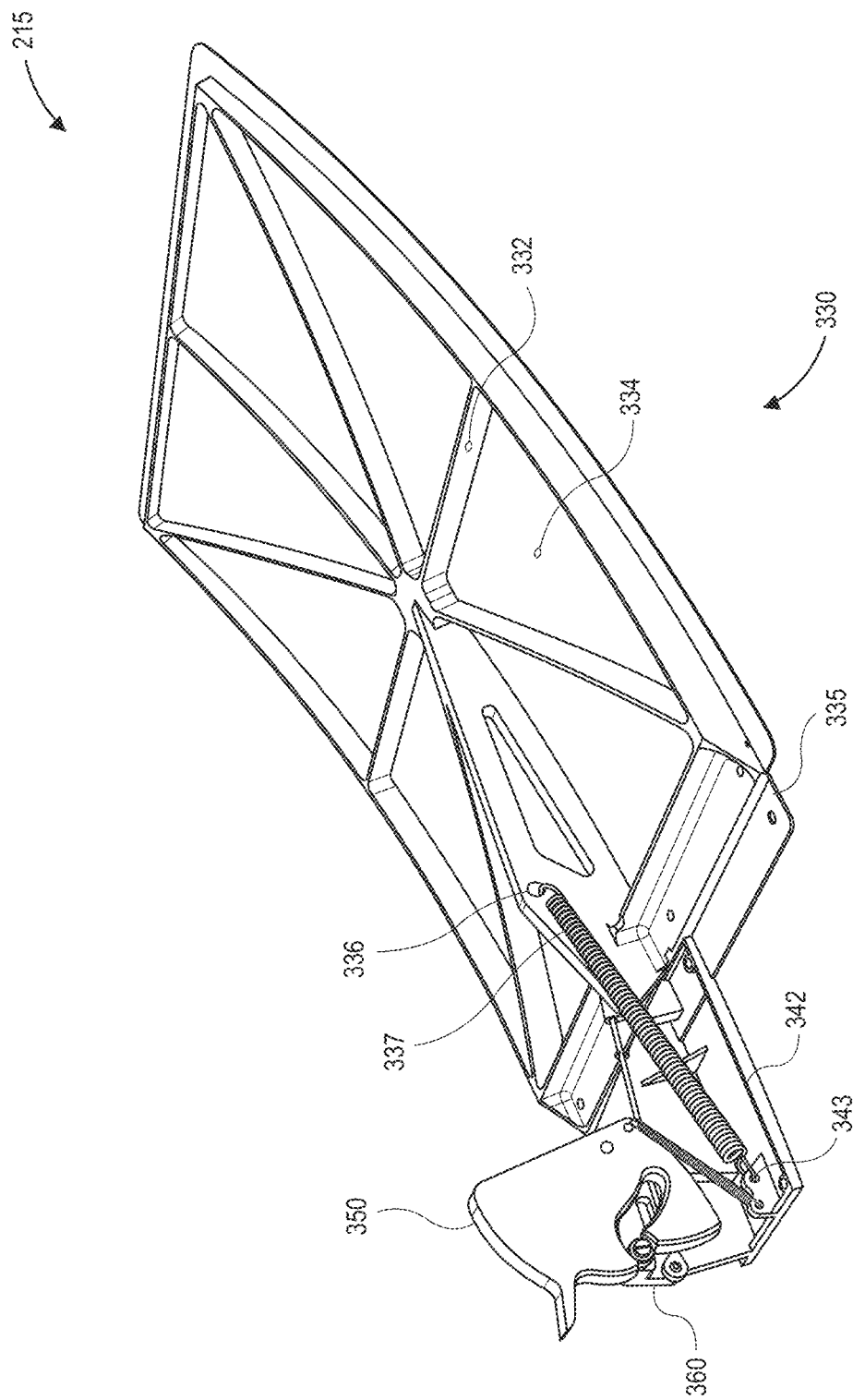
FIG. 3A is a schematic perspective view diagram of an example package delivery system, in accordance with implementations of the present disclosure.

FIG. 3A is a schematic perspective view diagram of an example package delivery system 215, in accordance with implementations of the present disclosure. As shown in FIG. 3A, the package delivery system or apparatus 215 may include a package door assembly 330 and an actuator assembly 340.

Figure 3B:
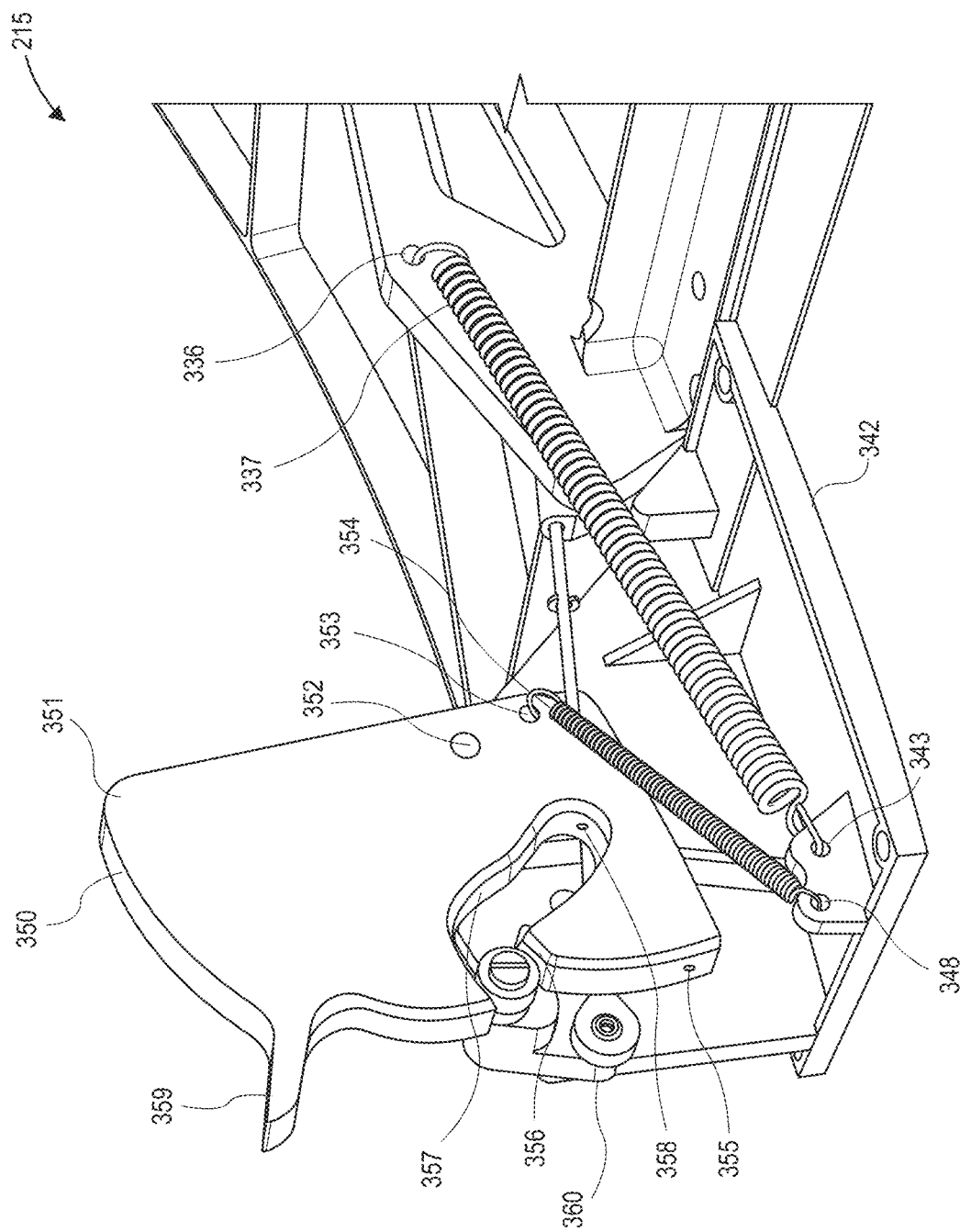
FIG. 3B is a schematic, close-up, perspective view diagram of the example package delivery system, in accordance with implementations of the present disclosure.
Figure 3C:
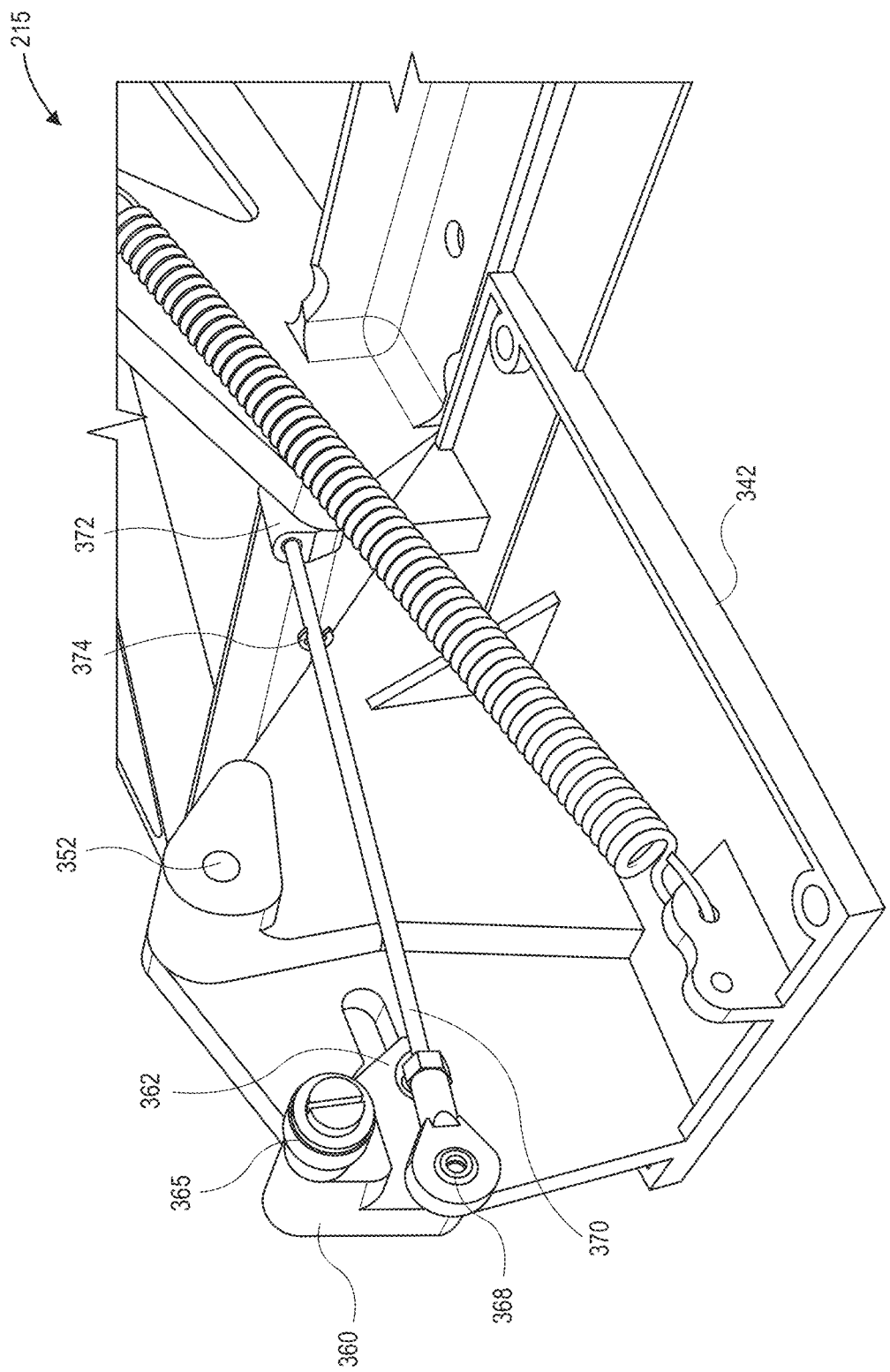
FIG. 3C is another schematic, close-up, perspective view diagram of the example package delivery system, in accordance with implementations of the present disclosure.
Figure 3D:
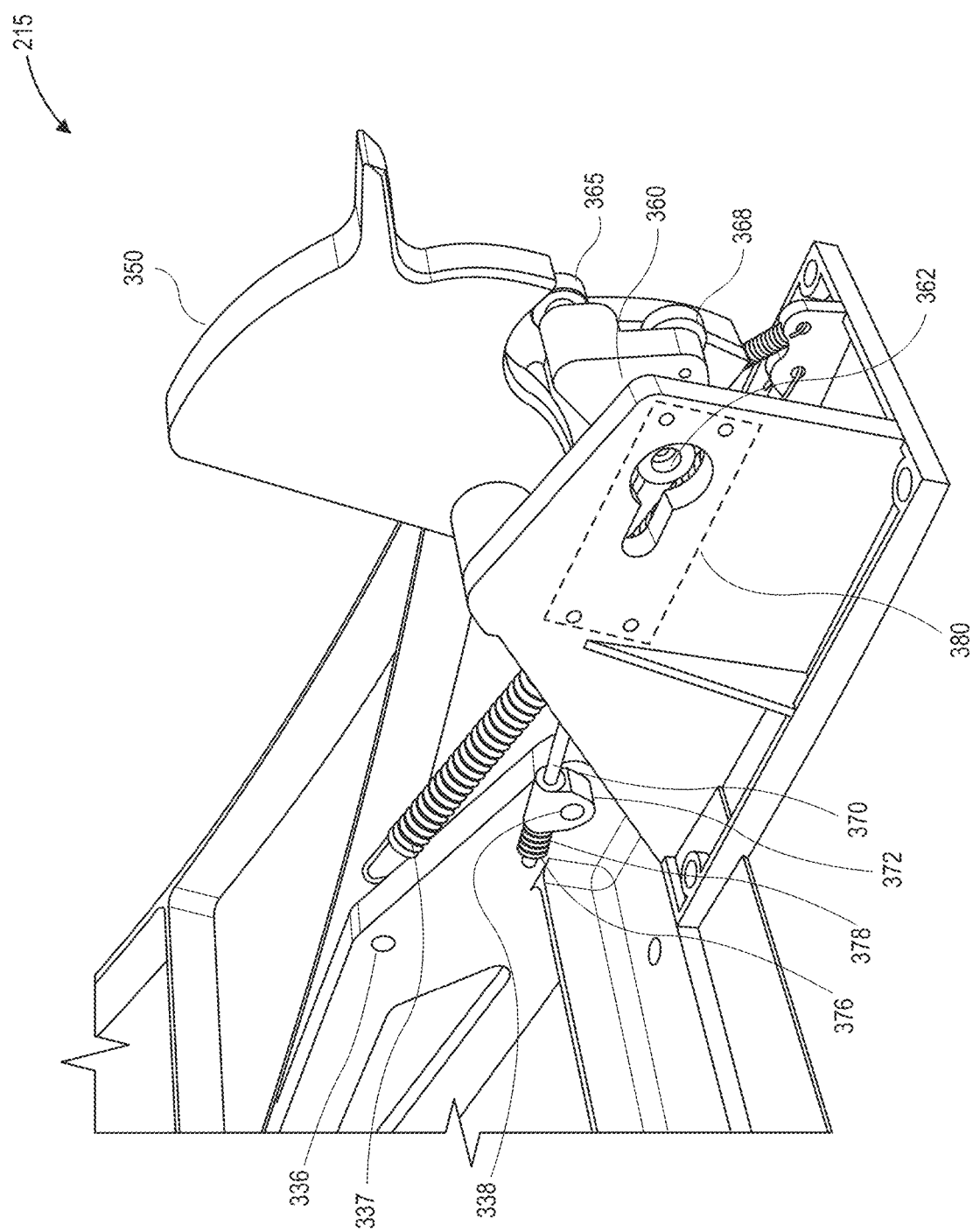
FIG. 3D is yet another schematic, close-up, perspective view diagram of the example package delivery system, in accordance with implementations of the present disclosure.

In example embodiments, the actuator assembly 340 may comprise a bracket 342, a servo or other actuator 380 (schematically illustrated in FIG. 3D), a servo arm 360, a latch 350, and a rod 370 (see FIGS. 3C and 3D). Further details of the actuator assembly 340 are discussed further below.

In example embodiments, the package door assembly 330 may include a door frame 332, a door skin 334, a door hinge 335, a door tension spring connection 336, a door tension spring 337, and a slider connection 338 (see FIG. 3D).

The door frame 332 may comprise a plurality of struts, bars, rails, rods, or other structural elements configured to provide structural support for a door skin 334, and the door skin 334 may be coupled, fastened, adhered, or otherwise attached to the door frame 332. The door frame 332 and door skin 334 may be sized to receive, hold, and release packages of a desired shape and size within a fuselage of a vehicle. The door frame 332 may be formed of various materials, such as plastics, carbon fiber, composites, metals, other materials, or combinations thereof, and the door frame 332 may be formed by injection molding, 3D printing, or other manufacturing processes. In addition, the door skin 334 may be formed of various materials, such as polycarbonate, plastics, carbon fiber, composites, other materials, or combinations thereof. Further, the door skin 334 may be at least partially translucent in order to facilitate visual confirmation, e.g., by human or automated agents, of the presence or absence of a package within the fuselage without actuating the door assembly to the open position. In other example embodiments, the door skin 334 may include holes, vents, perforations, or other orifices to allow at least partial airflow between outer and inner surfaces of the door skin 334, which may reduce forces, torques or pressure tending to open the door assembly 330 due to airflow substantially parallel to the outer surface of the door skin 334 and/or may reduce forces, torques or pressure tending to open or close the door assembly 330 due to airflow substantially perpendicular to the outer or inner surfaces of the door skin 334.

In addition, the door frame 332 and the door skin 334 may be coupled to the fuselage by the door hinge 335. The door hinge 335 may comprise various types of hinges, including butt hinges, piano hinges, living hinges, or other types of hinges. In an example embodiment, the door hinge 335 may comprise a carbon fiber hinge having two carbon fiber leaves and a flexible layer of Kevlar connected therebetween to facilitate rotation or pivoting of the hinge. The door hinge 335 may permit movement of the door frame 332 and the door skin 334 relative to the fuselage between at least two positions, e.g., an open position and a closed position. In addition, the door hinge 335 may be formed of various materials, such as metals, plastics, carbon fiber, composites, other materials, or combinations thereof.

Further, the door tension spring connection 336 may comprise a hole, a pin, a shaft, a fastener, or any other attachment element associated with a portion of the door frame 332. In addition, the bracket 342 may also include a door tension spring connection 343 that may comprise a hole, a pin, a shaft, a fastener, or any other attachment element associated with the bracket 342. A first end of the door tension spring 337 may be coupled to the door tension spring connection 336 of the portion of the door frame 332, and a second end of the door tension spring 337 may be coupled to the door tension spring connection 343 of the bracket 342. In this manner, the door tension spring 337 may apply a bias force or torque to the door frame 332 and the door skin 334 toward a closed position.

Although the description herein refers to a door tension spring 337 and corresponding connections 336, 343 associated with a portion of the door frame 332 and the bracket 342, in other example embodiments, instead of or in addition to the door tension spring 337, a torsion spring may be associated with the door hinge 335 to bias the door frame 332 and the door skin 334 toward a closed position, and/or other types of springs connected between various portions of the door assembly 330 and other portions of the package delivery apparatus 215 may be used to bias the door frame 332 and the door skin 334 toward a closed position.

Furthermore, the slider connection 338 (see FIG. 3D) may also comprise a hole, a pin, a shaft, a fastener, or any other attachment element associated with a portion of the door frame 332. A slider 372 (see FIG. 3D) may be pivotably coupled to the slider connection 338 to control movement of the door assembly 330 between the open position and the closed position, as further described herein.

FIG. 3B is a schematic, close-up, perspective view diagram of the example package delivery system 215, in accordance with implementations of the present disclosure.

In example embodiments, the bracket 342 may be coupled, adhered, fastened, or otherwise attached to an interior or other portion of a vehicle, e.g., to an interior of a fuselage of a vehicle. In addition, the bracket 342 may include a door tension spring connection 343 that may comprise a hole, a pin, a shaft, a fastener, or any other attachment element associated with the bracket 342, to which a second end of the door tension spring 337 may be coupled in order to apply a bias force or torque to the door frame 332 and the door skin 334 toward a closed position. The bracket 342 may be formed of various materials, such as aluminum, steel, other metals, plastics, composites, other materials, or combinations thereof, and the bracket 342 may be formed by machining, injection molding, 3D printing, or other manufacturing processes.

In example embodiments, the latch 350 may comprise a particular size, shape, and configuration having a plurality of portions to interact or interface with portions of the servo arm 360. The latch 350 may be formed of various materials, such as hard anodized aluminum, steel, other metals, plastics, composites, other materials, or combinations thereof.

As shown in FIG. 3B, the latch 350 may include a pivotable connection 352 to the bracket 342 and a latch tension spring connection 353 to which a first end of a latch tension spring 354 may be coupled. The pivotable connection 352 may comprise a hole, a pin, a shaft, a fastener, or any other attachment element configured to allow rotation of the latch 350 relative to the bracket 342 around an axis associated with the pivotable connection 352.

Further, the latch tension spring connection 353 may comprise a hole, a pin, a shaft, a fastener, or any other attachment element associated with a portion of the latch 350. In addition, the bracket 342 may also include a latch tension spring connection 348 that may comprise a hole, a pin, a shaft, a fastener, or any other attachment element associated with the bracket 342. A first end of the latch tension spring 354 may be coupled to the latch tension spring connection 353 of the portion of the latch 350, and a second end of the latch tension spring 354 may be coupled to the latch tension spring connection 348 of the bracket 342. In this manner, the latch tension spring 354 may apply a bias force or torque to the latch 350 to rotate in a first direction, e.g., substantially clockwise as shown in FIG. 3B.

Although the description herein refers to a latch tension spring 354 and corresponding connections 353, 348 associated with a portion of the latch 350 and the bracket 342, in other example embodiments, instead of or in addition to the latch tension spring 354, a torsion spring may be associated with the pivotable connection 352 of the latch 350 to bias the latch 350 to rotate in the first direction, e.g., substantially clockwise as shown in FIG. 3B, and/or other types of springs connected between various portions of the latch 350 and other portions of the package delivery apparatus 215 may be used to bias the latch 350 to rotate in the first direction, e.g., substantially clockwise as shown in FIG. 3B.

Further, as shown in FIG. 3B, the latch 350 may also include a plurality of portions, including a shoulder 351, a foot 355, a mouth 356, a channel 357, a terminal end 358 of the channel 357, and a finger 359. As described further herein, a portion of the servo arm 360 may contact various of the plurality of portions of the latch 350, including the foot 355, the mouth 356, the channel 357, and the terminal end 358 of the channel 357, to move or rotate the latch 350 between a plurality of positions associated with different operational states of the package delivery apparatus. The plurality of positions associated with different operational states of the package delivery apparatus may include a loading position, a locking position, a sensing position, and a release position. Moreover, as further described herein, a portion of the servo arm 360 may move or rotate the latch 350 such that various portions of the latch 350, including the shoulder 351 and the finger 359, may enter, obstruct, or block a portion of a package path via which a package may be loaded, held, and released relative to a fuselage of a vehicle. Further, in each of the various rotational positions of the servo arm 360 and resulting movements or rotations of the latch 350, the bias force or torque of the latch tension spring 354 may also affect the movements or rotations of the latch 350 relative to the bracket 342 around an axis associated with the pivotable connection 352.

FIG. 3C is another schematic, close-up, perspective view diagram of the example package delivery system 215, in accordance with implementations of the present disclosure.

In FIG. 3C, the latch 350 and the latch tension spring 354 are not shown in the illustration, in order to more clearly illustrate and describe portions of the bracket 342, the servo arm 360, and the rod 370 that are at least partially obscured by the latch 350 and the latch tension spring 354 in FIG. 3B. For reference, the pivotable connection 352 between the latch 350 and the bracket 342 is illustrated in FIG. 3C.

In example embodiments, the servo arm 360 may comprise a particular size, shape, and configuration, and may include a connection or coupling 362 to a rotatable shaft of a servo or other actuator that is attached to the bracket 342, a cam follower 365 that interacts or interfaces with at least some of the plurality of portions of the latch 350, and a pivotable connection 368 to a first end of a rod 370. The servo arm 360 may be formed of various materials, such as hard anodized aluminum, steel, other metals, plastics, composites, other materials, or combinations thereof.

The connection or coupling 362 may comprise a hole, a pin, a shaft, a fastener, or any other attachment element configured to couple the servo arm 360 to a rotatable shaft of a servo or other actuator such that the servo arm 360 rotates responsive to actuation of the servo or other actuator around an axis associated with the connection or coupling 362. In addition, the pivotable connection 368 to the first end of the rod 370 may also comprise a hole, a pin, a shaft, a fastener, or any other attachment element configured to allow rotation or pivoting of the first end of the rod 370 relative to the servo arm 360 around an axis associated with the pivotable connection 368.

In addition, the cam follower 365 may comprise a shoulder bolt having a bearing, a shaft, a pin, or other similar element coupled to the servo arm 360. In an example embodiment, the shoulder bolt may be a cylindrical shoulder bolt having a steel bearing that is rotatable around the shoulder bolt. The cam follower 365 may be configured to interact or interface with at least some of the plurality of portions of the latch 350 responsive to rotation of the servo arm 360 by the servo or other actuator. For example, in various rotational positions of the servo arm 360, the cam follower 365 may contact the foot 355, the mouth 356, the channel 357, or the terminal end 358 of the channel 357 of the latch 350 to rotate and position the latch 350 in a plurality of positions associated with different operational states of the package delivery apparatus.

Further, as shown in FIG. 3C, a rod 370 may be coupled between the servo arm 360 and a portion of the door frame 332. The rod 370 may be formed of various materials, such as stainless steel, aluminum, other metals, plastics, composites, other materials, or combinations thereof. A first end of the rod 370 may be pivotably coupled to the servo arm 360 via the pivotable connection 368. For example, in various rotational positions of the servo arm 360, the rod 370 may be at least partially pushed or pulled toward or away from the door assembly 330 via the pivotable connection 368 to the servo arm 360, in order to control movement of the door assembly 330 between an open position and a closed position.

FIG. 3D is yet another schematic, close-up, perspective view diagram of the example package delivery system 215, in accordance with implementations of the present disclosure. The perspective view diagram of FIG. 3D illustrates an opposing or back side perspective view of the example package delivery system 215 as compared to the perspective view diagrams of FIGS. 3A-3C.

As shown in FIGS. 3C and 3D, a second end of the rod 370 may be pivotably coupled to a portion of the door frame 332. For example, a slider 372 may be movably coupled to the second end of the rod 370, and the slider 372 may be pivotably coupled to the door frame 332 via the slider connection 338. The slider 372 may be formed of various materials, such as brass, steel, aluminum, other metals, plastics, composites, other materials, or combinations thereof.

In addition, the slider 372 may move along the second end of the rod between a first end stop 374 and a second end stop 376. Each of the first and second end stops 374, 376 may comprise retaining rings, washers, stopping plates or rings, fasteners, or other elements configured to constrain movement of the slider 372. Further, a compression spring 378, locking spring, or other bias element may be associated with the second end stop 376 in order to provide resistance or damping as the slider 372 moves toward the second end stop 376.

As described further herein, the servo arm 360 may move or rotate such that the rod 370 may be pushed or pulled via the pivotable connection 368 to the servo arm 360 toward or away from the door assembly 330, and the slider 372 may also be moved along the second end of the rod 370 between the first and second end stops 374, 376, between a plurality of positions associated with different operational states of the package delivery apparatus. The plurality of positions associated with different operational states of the package delivery apparatus may include a loading position, a locking position, a sensing position, and a release position. Further, in each of the various rotational positions of the servo arm 360 and resulting movements of the rod 370 and/or slider 372, the bias force or torque of the door tension spring 337 may also affect the position of the slider 372 along the second end of the rod 370 between the first and second end stops 374, 376.

As further shown in FIG. 3D, a mounting or attachment position of a servo or other actuator 380 to the bracket 342 is schematically illustrated by dashed lines. A rotatable shaft of the servo or other actuator 380 may be coupled to the servo arm 360 via the connection or coupling 362 such that the servo arm 360 rotates responsive to actuation of the servo or other actuator 380 around an axis associated with the connection or coupling 362. In other example embodiments, the mounting or attachment position of the servo or other actuator 380 may have other shapes or sizes, as long as a rotatable shaft of the servo or other actuator 380 may couple to the servo arm 360 via the connection or coupling 362.

Figure 4A:
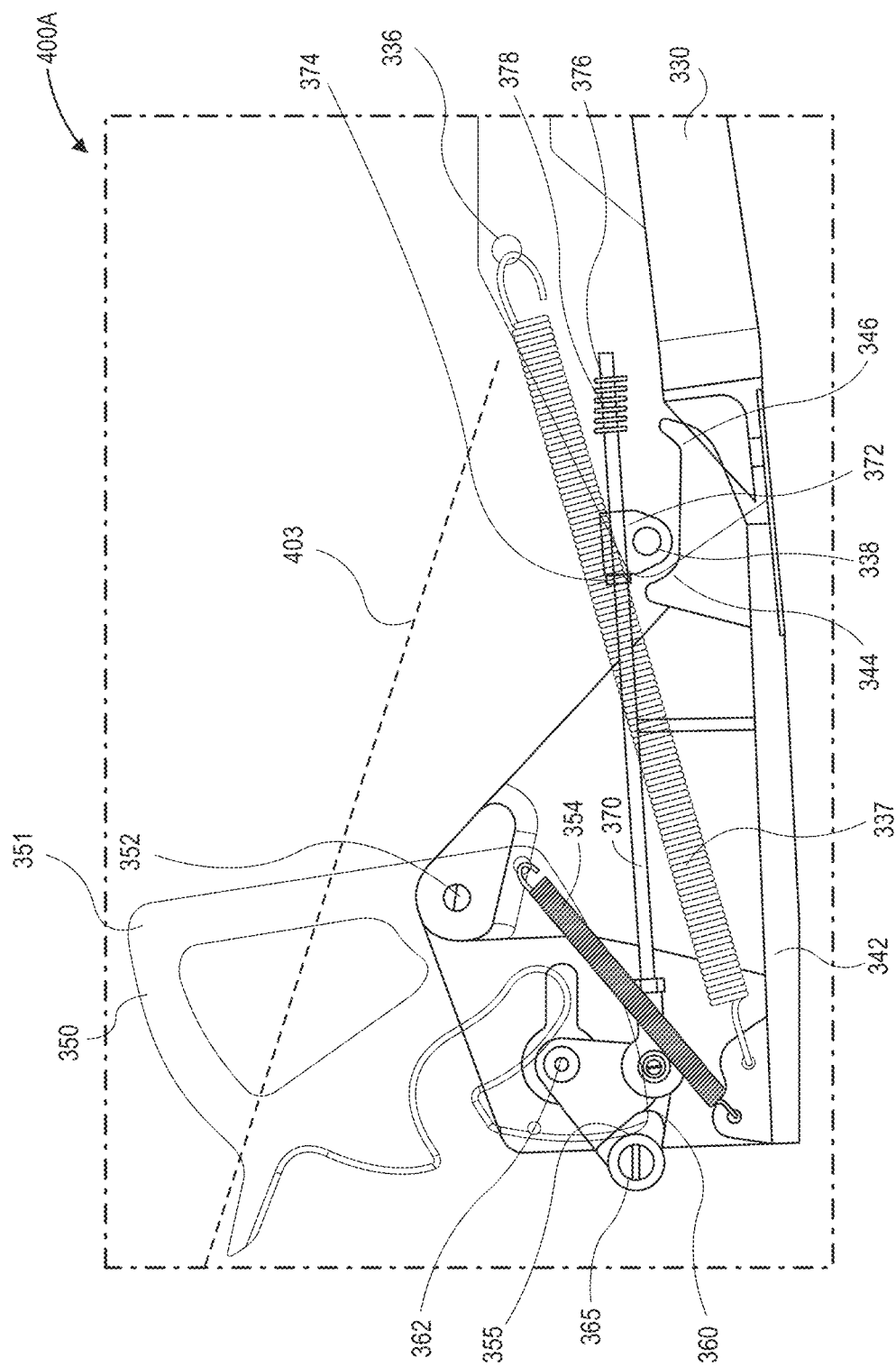
FIG. 4A is a schematic, close-up, side view diagram of the example package delivery system in a loading position with the package door closed, in accordance with implementations of the present disclosure.

FIG. 4A is a schematic, close-up, side view diagram 400A of the example package delivery system in a loading position with the package door closed, in accordance with implementations of the present disclosure. At least portions of the door assembly 330, the door tension spring 337, and the latch 350 are shown as substantially transparent in order to illustrate rotations, movements, positions, or other portions of components that may be obscured by portions of the door assembly 330, the door tension spring 337, and the latch 350 in the side view diagram 400A.

In the loading position with the door assembly 330 closed, the servo arm 360 may be rotated by the servo around an axis associated with the connection or coupling 362 to the position shown in FIG. 4A. In addition, the cam follower 365 of the servo arm 360 may contact one or more portions of the latch 350 and may cause rotation of the latch 350, with or against a bias force or torque exerted on the latch 350 by the latch tension spring 354, around the pivotable connection 352 to the position shown in FIG. 4A. Accordingly, in the loading position with the door assembly 330 closed, the cam follower 365 of the servo arm 360 may contact or be positioned adjacent a foot 355 of the latch 350. In this manner, the shoulder 351 of the latch 350 may be movably positioned within a package path 403 via which a package may be received by a vehicle.

Further, the rotation of the servo arm 360 by the servo to the position shown in FIG. 4A may cause movement of the rod 370 to the position shown in FIG. 4A. Due to the bias force or torque of the door tension spring 337 maintaining the door assembly 330 in the closed position, the slider 372 that is pivotably coupled to the door assembly 330 via the slider connection 338 may contact or be positioned adjacent the first end stop 374 along the second end of the rod 370. In this manner, the door assembly 330 may be maintained in the closed position with the slider 372 positioned adjacent the first end stop 374 by the bias force or torque of the door tension spring 337.

In some example embodiments, the bracket 342 may also include a first protrusion 344 and a second protrusion 346 between which the slider 372 may move. For example, as shown in FIG. 4A, the first protrusion 344 may additionally prevent the slider 372 from moving beyond the first end stop 374 of the rod 370, such that the door assembly 330 may be prevented from excessive closing movement beyond the closed position.

Figure 4B:
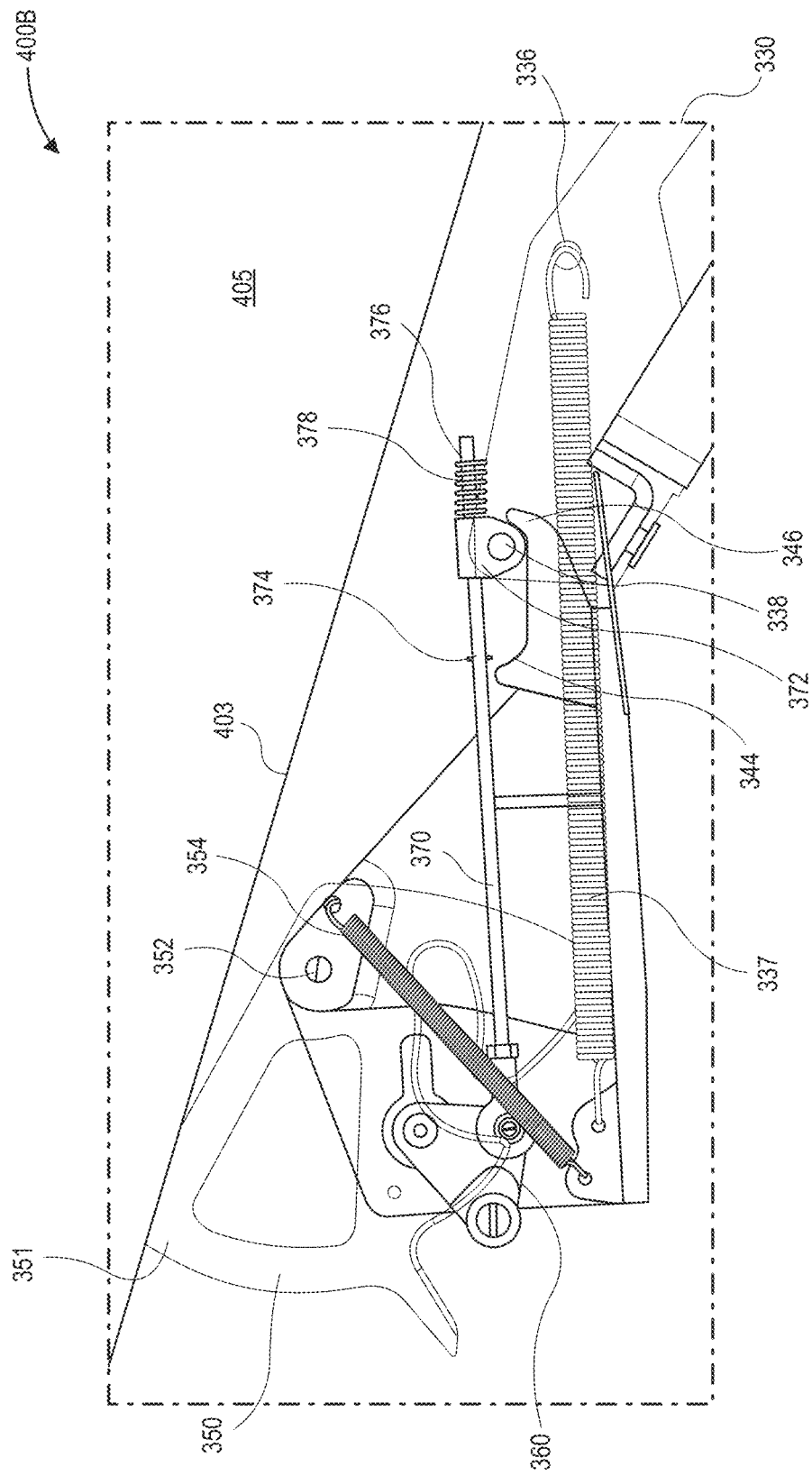
FIG. 4B is a schematic, close-up, side view diagram of the example package delivery system in a loading position with the package door open, in accordance with implementations of the present disclosure.

FIG. 4B is a schematic, close-up, side view diagram 400B of the example package delivery system in a loading position with the package door open, in accordance with implementations of the present disclosure. At least portions of the door assembly 330, the door tension spring 337, and the latch 350 are shown as substantially transparent in order to illustrate rotations, movements, positions, or other portions of components that may be obscured by portions of the door assembly 330, the door tension spring 337, and the latch 350 in the side view diagram 400B.

In the loading position with the door assembly 330 open, the servo arm 360 and the cam follower 365 may be maintained by the servo in the position shown in FIG. 4B. In addition, responsive to loading of a package 405 via the package path 403 and contact between a portion of the package 405 and the shoulder 351 of the latch 350, the latch 350 may be rotated in a direction against the bias force or torque exerted on the latch 350 by the latch tension spring 354 around the pivotable connection 352 to the position shown in FIG. 4B. Further, responsive to fully seating the package 405 and/or an end or edge of the package 405 clearing the shoulder 351 of the latch 350, the latch 350 may rotate around the pivotable connection 352 back to the position shown in FIG. 4A due to the bias force or torque exerted on the latch 350 by the latch tension spring 354. In this manner, the shoulder 351 of the latch 350 may be moved relative to the package path 403 in order to receive a package 405 by the vehicle, without moving or actuating the servo and servo arm 360. Further, during rotation of the latch 350 between the positions shown in FIGS. 4A and 4B, the latch 350 may not cause movement of the servo arm 360 such that the servo may not be backdriven or loaded by rotation of the latch 350 during loading of a package.

Further, responsive to an opening force or torque applied to the door assembly 330 against the bias force or torque of the door tension spring 337, the door assembly 330 may move to the open position shown in FIG. 4B. In the open position, the door tension spring 337 may move or translate relatively closer to the door hinge 335 due to the movement of the door tension spring connection 336 during opening of the door assembly 330. As a result, a closing force or torque applied by the door tension spring 337 tending to bias the door assembly 330 toward the closed position may be reduced in the open position due to the reduced distance between the force or torque applied by the door tension spring 337 and a rotational axis of the door hinge 335. In addition, the slider 372 that is pivotably coupled to the door assembly 330 via the slider connection 338 may move toward, contact, or be positioned adjacent the second end stop 376 along the second end of the rod 370, but may not compress the compression spring 378 associated with the second end stop 376 such that the servo may not be backdriven or loaded by the opening force or torque. Responsive to receiving the package 405 via the package path 403 through the opening of the door assembly 330 in the open position, the opening force or torque applied to the door assembly 330 may be removed, such that the door assembly 330 may return to the closed position shown in FIG. 4A due to the bias force or torque of the door tension spring 337. In this manner, the door assembly 330 may be moved between the closed position and the open position by moving the slider 372 between the first and second end stops 374, 376 along the second end of the rod 370 in order to receive a package 405 by the vehicle, without moving or actuating the servo and servo arm 360.

In some example embodiments, the bracket 342 may also include a first protrusion 344 and a second protrusion 346 between which the slider 372 may move. For example, as shown in FIG. 4B, the second protrusion 346 may additionally prevent the slider 372 from moving beyond the second end stop 376 of the rod 370, such that the door assembly 330 may be prevented from excessive opening movement beyond the open position.

Figure 5:
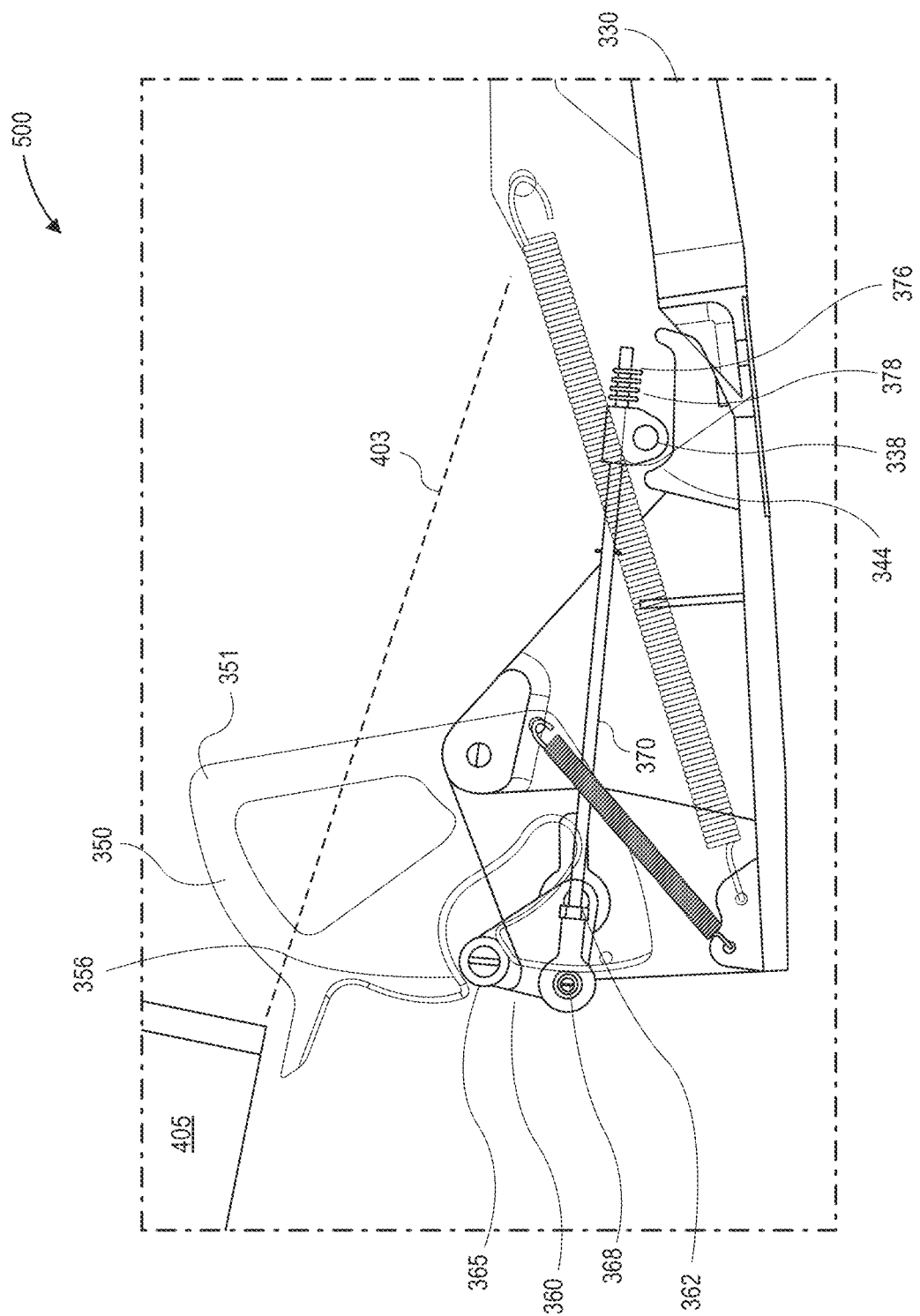
FIG. 5 is a schematic, close-up, side view diagram of the example package delivery system in a locking position, in accordance with implementations of the present disclosure.

FIG. 5 is a schematic, close-up, side view diagram 500 of the example package delivery system in a locking position, in accordance with implementations of the present disclosure. At least portions of the door assembly 330, the door tension spring 337, and the latch 350 are shown as substantially transparent in order to illustrate rotations, movements, positions, or other portions of components that may be obscured by portions of the door assembly 330, the door tension spring 337, and the latch 350 in the side view diagram 500.

In the locking position, the servo arm 360 may be rotated by the servo around an axis associated with the connection or coupling 362 to the position shown in FIG. 5. In addition, the cam follower 365 of the servo arm 360 may contact one or more portions of the latch 350 and may cause rotation of the latch 350, with or against a bias force or torque exerted on the latch 350 by the latch tension spring 354, around the pivotable connection 352 to the position shown in FIG. 5. Accordingly, in the locking position, the cam follower 365 of the servo arm 360 may contact or be positioned adjacent or within a mouth 356 of the latch 350. In this manner, the position of the latch 350 may be locked, and the shoulder 351 of the latch 350 may be fixedly positioned within a package path 403 via which a package 405 may be received by the vehicle.

Furthermore, as shown in FIG. 5, an axis associated with the cam follower 365 and an axis associated with the connection or coupling 362 may be substantially aligned such that any forces or torques exerted on the latch 350 by the package 405, e.g., by contact between the package 405 and the shoulder 351 or the finger 359 of the latch 350, may be transferred via the mouth 356 of the latch 350 and the cam follower 365 substantially directly to the axis associated with the connection or coupling 362 between the servo and the servo arm 360. That is, the direction of any forces or torques exerted on the latch 350 by the package 405, and transferred via the mouth 356 of the latch 350 to the cam follower 365, may substantially intersect with, e.g., or be substantially dead center or over center of, the axis of the connection or coupling 362 of the servo arm 360. In this manner, backdriving or loading of the servo in the locking position due to forces or torques exerted on the latch 350 by movement of the package 405 may be substantially prevented.

Further, the rotation of the servo arm 360 by the servo to the position shown in FIG. 5 may cause movement of the rod 370 to the position shown in FIG. 5. Due to the movement of the rod 370, the slider 372 that is pivotably coupled to the door assembly 330 via the slider connection 338 may contact or be positioned adjacent the second end stop 376 along the second end of the rod 370, and may at least partially compress the compression spring 378 associated with the second end stop 376. In this manner, the door assembly 330 may be fixedly held or locked in the closed position by the slider 372 positioned adjacent the second end stop 376 along the second end of the rod 370 as shown in FIG. 5.

Moreover, as shown in FIG. 5, an axis associated with the pivotable connection 368 of the rod 370 and an axis associated with the connection or coupling 362 may also be substantially aligned such that any forces or torques exerted on the rod 370 by the door assembly 330, e.g., by wind or external forces or torques tending to open or close the door assembly 330, may be transferred via the slider 372, the rod 370, and the pivotable connection 368 substantially directly to the axis associated with the connection or coupling 362 between the servo and the servo arm 360. That is, the direction of any forces or torques exerted on the door assembly 330, and transferred via the slider 372 and the rod 370 to the pivotable connection 368, may substantially intersect with, e.g., be substantially dead center or over center of, the axis of the connection or coupling 362 of the servo arm 360. In this manner, backdriving or loading of the servo in the locking position due to wind or external forces or torques applied to the door assembly 330 may be substantially prevented.

In some example embodiments, the bracket 342 may also include a first protrusion 344 and a second protrusion 346 between which the slider 372 may move. For example, as shown in FIG. 5, the first protrusion 344 may additionally prevent the slider 372 from moving beyond the position shown in FIG. 5, such that the door assembly 330 may be prevented from excessive closing movement beyond the closed position.

Figure 6:
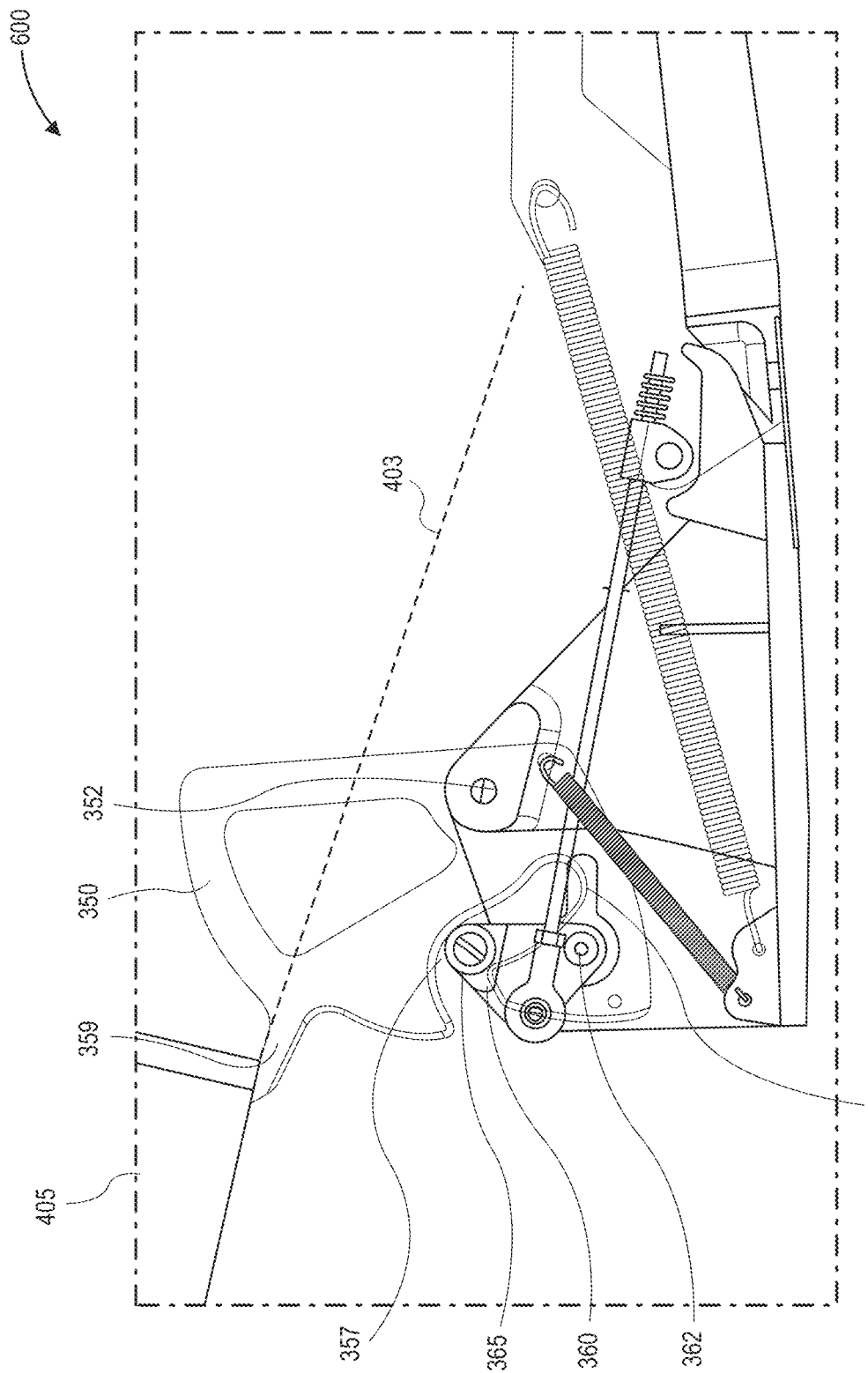
FIG. 6 is a schematic, close-up, side view diagram of the example package delivery system in a sensing position, in accordance with implementations of the present disclosure.

FIG. 6 is a schematic, close-up, side view diagram 600 of the example package delivery system in a sensing position, in accordance with implementations of the present disclosure. At least portions of the door assembly 330, the door tension spring 337, and the latch 350 are shown as substantially transparent in order to illustrate rotations, movements, positions, or other portions of components that may be obscured by portions of the door assembly 330, the door tension spring 337, and the latch 350 in the side view diagram 600.

In the sensing position, the servo arm 360 may be rotated by the servo around an axis associated with the connection or coupling 362 from the locking position in a clockwise direction as partially shown in FIG. 6. In addition, the cam follower 365 of the servo arm 360 may rotate to contact one or more portions of the channel 357 of the latch 350, and may ultimately rotate to contact a terminal end 358 of the channel 357 of the latch 350, during which the latch 350 may at least partially rotate around the pivotable connection 352. Accordingly, in the sensing position, the cam follower 365 of the servo arm 360 may contact or be positioned adjacent various portions of the channel 357 of the latch 350, including the terminal end 358 of the latch 350, and the finger 359 of the latch 350 may at least partially enter a package path 403 in which a package 405 may be present. In this manner, the finger 359 of the latch 350 may at least partially move into or enter a package path 403 in order to determine the presence or absence of a package 405 within the package path 403, e.g., by determining or measuring a maximum angle or amount of rotation that the servo rotated the servo arm 360 and the latch 350 before the cam follower 365 of the servo arm 360 contacted the terminal end 358 of the channel 357, if no package is present, or before the finger 359 of the latch 350 contacted a portion of the package 405, if a package is present.

Further, the rotation of the servo arm 360 by the servo from the locking position in the clockwise direction as partially shown in FIG. 6 may cause little to no movement of the rod 370 from the position shown in FIG. 5. Due to the position of the rod 370 in FIG. 6, the slider 372 that is pivotably coupled to the door assembly 330 via the slider connection 338 may maintain contact or be positioned adjacent the second end stop 376 along the second end of the rod 370, and may at least partially compress the compression spring 378 associated with the second end stop 376. In this manner, the door assembly 330 may remain fixedly held or locked in the closed position by the slider 372 positioned adjacent the second end stop 376 along the second end of the rod 370 as shown in FIG. 6.

In some example embodiments as described herein, the bracket 342 may also include a first protrusion 344 and a second protrusion 346 between which the slider 372 may move. For example, as shown in FIG. 6, the first protrusion 344 may additionally prevent the slider 372 from moving beyond the position shown in FIG. 6, such that the door assembly 330 may be prevented from excessive closing movement beyond the closed position.

Figure 7:
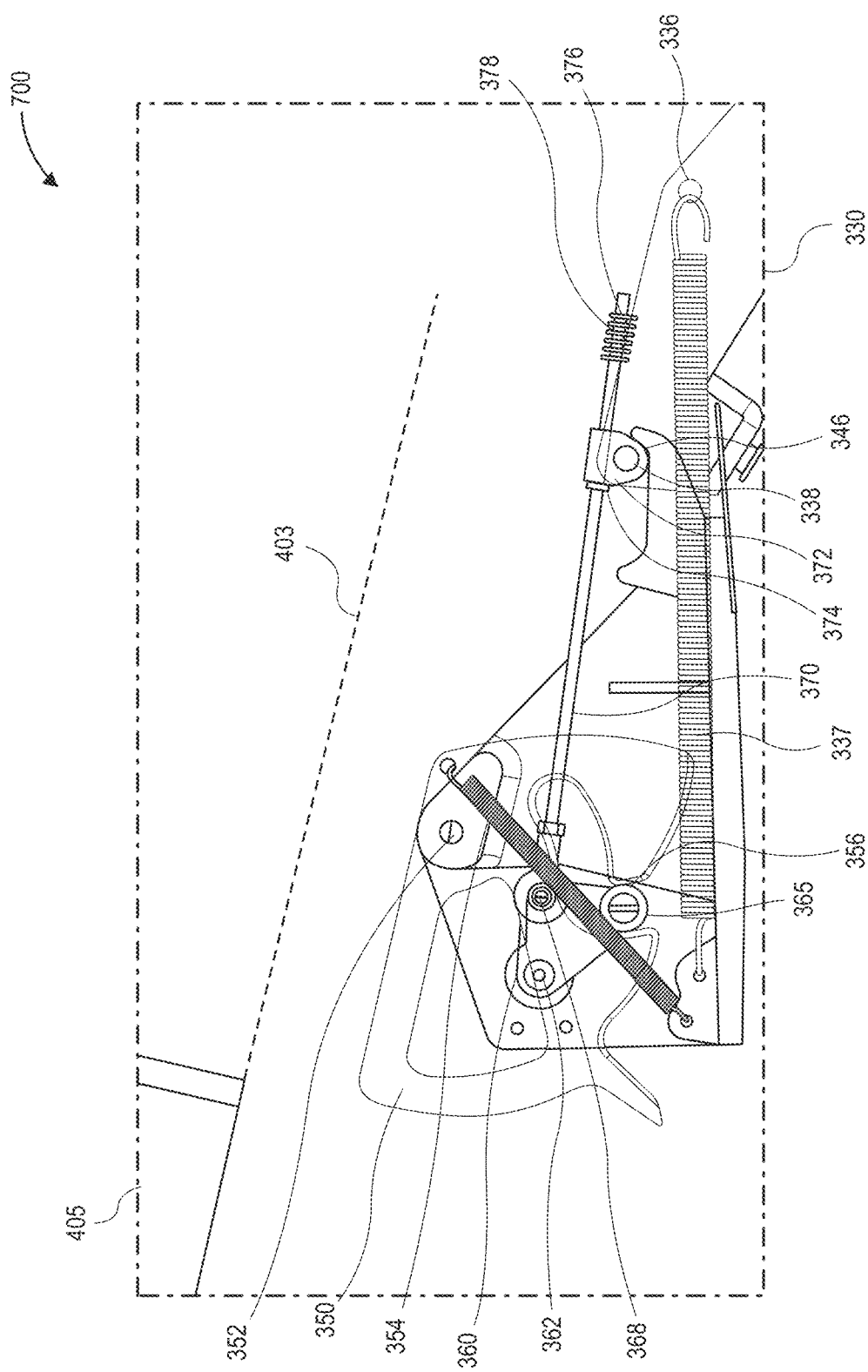
FIG. 7 is a schematic, close-up, side view diagram of the example package delivery system in a release position, in accordance with implementations of the present disclosure.

FIG. 7 is a schematic, close-up, side view diagram 700 of the example package delivery system in a release position, in accordance with implementations of the present disclosure. At least portions of the door assembly 330, the door tension spring 337, and the latch 350 are shown as substantially transparent in order to illustrate rotations, movements, positions, or other portions of components that may be obscured by portions of the door assembly 330, the door tension spring 337, and the latch 350 in the side view diagram 700.

In the release position, the servo arm 360 may be rotated by the servo around an axis associated with the connection or coupling 362 to the position shown in FIG. 7. In addition, the cam follower 365 of the servo arm 360 may contact one or more portions of the latch 350 and may cause rotation of the latch 350, against a bias force or torque exerted on the latch 350 by the latch tension spring 354, around the pivotable connection 352 to the position shown in FIG. 7. Accordingly, in the release position, the cam follower 365 of the servo arm 360 may contact or be positioned adjacent or within a mouth 356 of the latch 350. In this manner, the position of the latch 350 may be locked or held, and no portion of the latch 350 may be positioned within a package path 403 via which a package 405 may be released from the vehicle, such that the package path 403 may be substantially unobstructed.

Further, the rotation of the servo arm 360 by the servo to the position shown in FIG. 7 may cause movement of the rod 370 to the position shown in FIG. 7. Due to the movement of the rod 370, the slider 372 that is pivotably coupled to the door assembly 330 via the slider connection 338 may contact or be positioned adjacent the first end stop 374 along the second end of the rod 370, and further due to the movement of the rod 370, the first end stop 374 may push the slider 372 and thereby move the door assembly 330 to the open position against the bias force or torque of the door tension spring 337. In this manner, the door assembly 330 may be fixedly held or locked in the open position, against the bias force or torque of the door tension spring 337, by the slider 372 positioned adjacent and pushed by the first end stop 374 along the second end of the rod 370 as shown in FIG. 7, in order to release a package 405 from the vehicle via the package path 403 through the opening of the door assembly 330 in the open position.

Moreover, as shown in FIG. 7, an axis associated with the pivotable connection 368 of the rod 370 and an axis associated with the connection or coupling 362 may be substantially aligned such that any forces or torques exerted on the rod 370 by the door assembly 330, e.g., by wind or external forces or torques tending to open or close the door assembly 330, may be transferred via the slider 372, the rod 370, and the pivotable connection 368 substantially directly to the axis associated with the connection or coupling 362 between the servo and the servo arm 360. That is, the direction of any forces or torques exerted on the door assembly 330, and transferred via the slider 372 and the rod 370 to the pivotable connection 368, may substantially intersect with, e.g., be substantially dead center or over center of, the axis of the connection or coupling 362 of the servo arm 360. In this manner, backdriving or loading of the servo in the release position due to wind or external forces or torques applied to the door assembly 330 may be substantially prevented.

In some example embodiments, the bracket 342 may also include a first protrusion 344 and a second protrusion 346 between which the slider 372 may move. For example, as shown in FIG. 7, the second protrusion 346 may additionally prevent the slider 372 from moving beyond the position shown in FIG. 7, such that the door assembly 330 may be prevented from excessive opening movement beyond the open position.

In other example embodiments, instead of or in addition to the first and second protrusions 344, 346 of the bracket 342, the bracket 342 may include a lip, tab, protrusion, or other element that is positioned between two opposing surfaces or portions of the door frame 332 that together act as mechanical stops in order to prevent excessive opening or closing of the door assembly 330. For example, in a closed position of the door assembly 330, a first or outer surface or portion of the door frame 332 may contact or be positioned adjacent the lip, tab, or protrusion of the bracket 342 to prevent excessive closing of the door assembly 330, and in an open position of the door assembly 330, a second or inner surface or portion of the door frame 332 may contact or be positioned adjacent the lip, tab, or protrusion of the bracket 342 to prevent excessive opening of the door assembly 330. The use of mechanical stops included as part of the bracket 342 and the door frame 332 may reduce forces, torques, or pressures applied to the rod 370, slider 372, first and second end stops 374, 376, and compression spring 378, and may thereby improve the reliability, structural integrity, and manufacturability of the mechanical stops that prevent excessive opening or closing of the door assembly 330. In further example embodiments, various other mechanical stops may be associated with different components of the package delivery apparatus described herein in order to prevent excessive opening or closing of the door assembly 330.

Although FIGS. 3A-7 show an example package delivery apparatus having particular sizes or dimensions, in other example embodiments, the sizes or dimensions of one or more components or portions may be modified, e.g., to load, lock, sense, and release packages of different sizes or dimensions. In addition, various components or portions of the example package delivery apparatus may be sized or configured to withstand various forces, torques, or pressures expected to be experienced by the various components or portions, e.g., due to opening or closing forces or torques applied to the door assembly, due to wind or other external forces, torques, or pressures applied to the door assembly, due to forces or torques applied to the latch by movements or vibrations of a package, due to forces, torques, or pressures applied to various components during operation or navigation of a vehicle, and/or due to other forces, torques, or pressures experienced by components of the package delivery apparatus.

In further example embodiments, one or more additional locking mechanisms may be included or used together with the example package delivery apparatus described herein. For example, one or more locks, switches, latches, doors, gates, hooks, pins, or other locking elements may be moved between locking and unlocking positions to hold or lock a package in a fully seated position within the package path, e.g., by blocking or interfering with the package path in the locking position, and by unblocking or clearing the package path in the unlocking position. In addition, one or more actuators such as servos, solenoids, motors, or other linear or rotary actuators may actuate or move the locking elements between the locking and unlocking positions to hold, lock, and release a package. Likewise, one or more locks, switches, latches, doors, gates, hooks, pins, or other locking elements may be moved between locking and unlocking positions to hold or lock a door assembly in a closed position, e.g., by blocking or interfering with movement of the package door in the locking position, and by unblocking or permitting movement of the package door in the unlocking position. Further, one or more actuators such as servos, solenoids, motors, or other linear or rotary actuators may actuate or move the locking elements between the locking and unlocking positions to hold, lock, and release a door assembly. Various other types of electrical and/or mechanical locks or switches may also be included as additional redundant locking mechanisms to ensure that the package is securely held or locked in the package path, and/or that the door assembly is securely held or locked in the closed position, e.g., in the event of a loss of power or various other potential failures associated with the package delivery apparatus.

Figure 8:
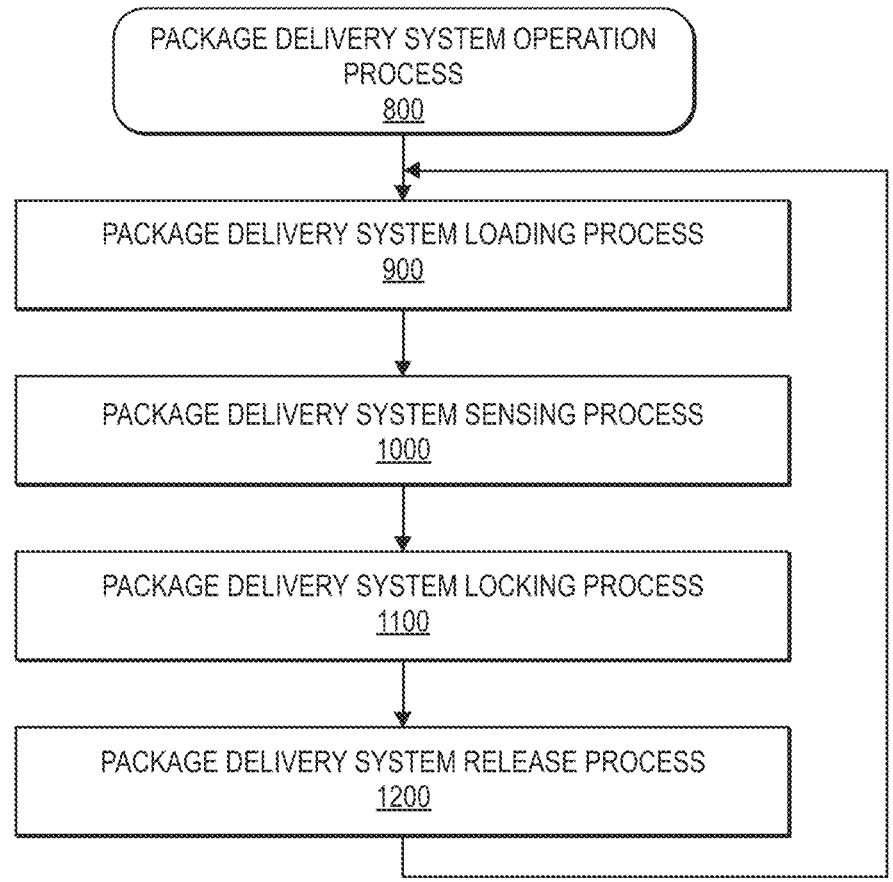
FIG. 8 is a flow diagram illustrating an example package delivery system operation process, in accordance with implementations of the present disclosure.

FIG. 8 is a flow diagram illustrating an example package delivery system operation process 800, in accordance with implementations of the present disclosure.

The process 800 may begin with a package delivery system loading process 900. For example, the package delivery system loading process 900 may cause movement or rotation of the servo, servo arm, latch, rod, and slider to respective loading positions to enable movement of a door assembly between closed and open positions and to enable loading of a package via a package path, as described at least with respect to FIGS. 4A and 4B. Further details of the package delivery system loading process 900 are described at least with respect to FIG. 9. Moreover, a controller may instruct the various steps of the package delivery system loading process 900.

The process 800 may continue with a package delivery system sensing process 1000. For example, the package delivery system sensing process 1000 may cause movement or rotation of the servo, servo arm, latch, rod, and slider to respective sensing positions to detect the presence or absence of a package within a package path, as described at least with respect to FIG. 6. Further details of the package delivery system sensing process 1000 are described at least with respect to FIG. 10. Moreover, a controller may instruct the various steps of the package delivery system sensing process 1000.

The process 800 may proceed with a package delivery system locking process 1100. For example, the package delivery system locking process 1100 may cause movement or rotation of the servo, servo arm, latch, rod, and slider to respective locking positions to hold or lock a door assembly in the closed position and to hold or maintain a package within a package path, as described at least with respect to FIG. 5. Further details of the package delivery system locking process 1100 are described at least with respect to FIG. 11. Moreover, a controller may instruct the various steps of the package delivery system locking process 1100.

The process 800 may then continue with a package delivery system release process 1200. For example, the package delivery system release process 1200 may cause movement or rotation of the servo, servo arm, latch, rod, and slider to respective release positions to hold or lock a door assembly in the open position and to release a package from within a package path, as described at least with respect to FIG. 7. Further details of the package delivery system release process 1200 are described at least with respect to FIGS. 12A-12B. Moreover, a controller may instruct the various steps of the package delivery system release process 1200.

The process 800 may repeat to load, lock, sense, and release a plurality of packages using a package delivery apparatus. In addition, various individual steps of the process 800 may be repeated and/or reordered as desired. For example, following the package delivery system release process 1200, the process 800 may repeat the package delivery system sensing process 1000 in order to detect the presence or absence of a package within a package path, e.g., to confirm that the package was released from within the package path of the vehicle as expected. Further, following the package delivery system release process 1200, the process 800 may repeat the package delivery system locking process 1100 before proceeding on to the package delivery system loading process 900, in order to hold or lock a door assembly in the closed position during operation or navigation of a vehicle to a destination at which a subsequent package is to be loaded into the package path of the vehicle. Various other combinations, modifications, or rearrangements of the steps of the process 800 may be possible.

Figure 9:
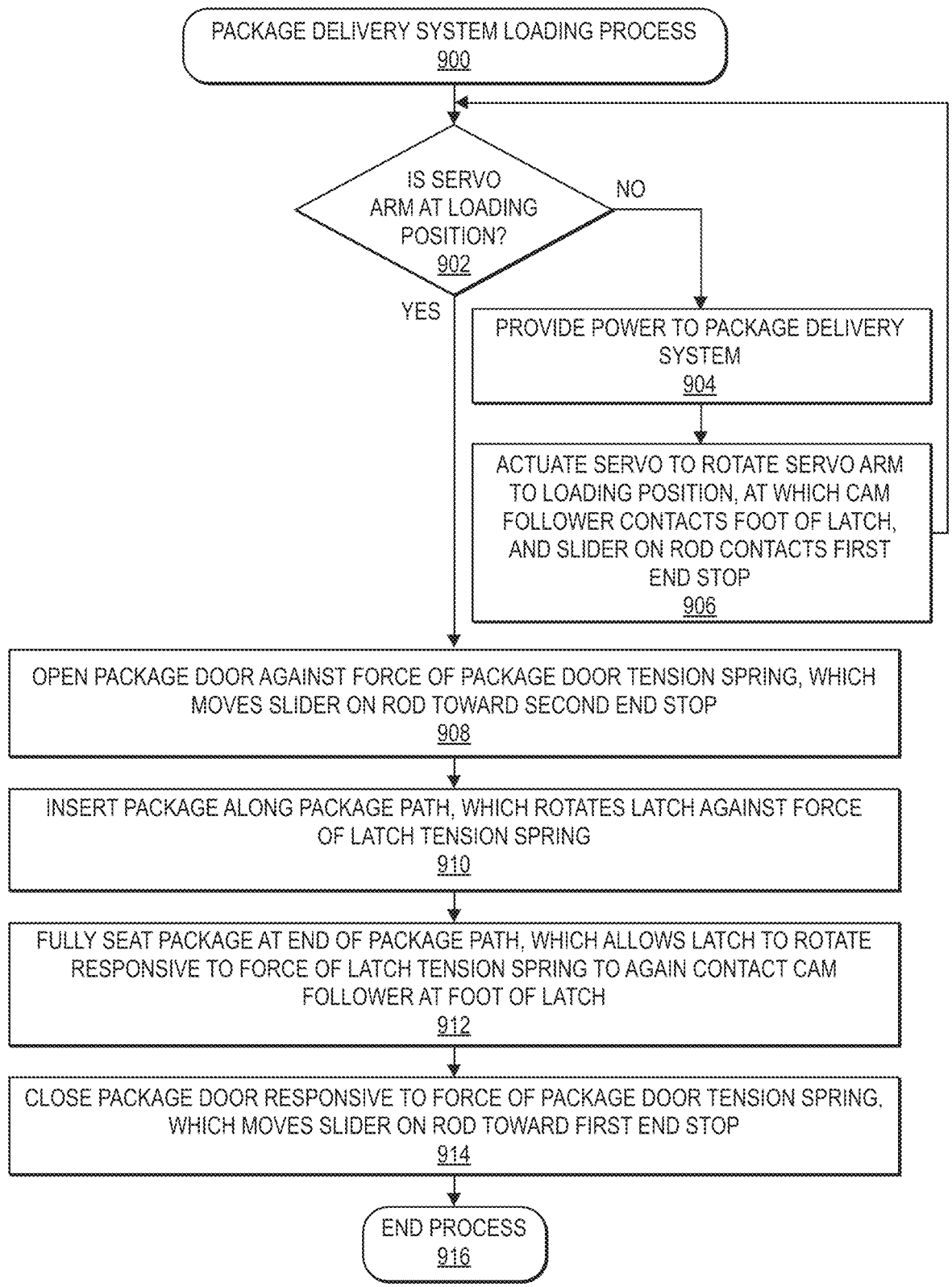
FIG. 9 is a flow diagram illustrating an example package delivery system loading process, in accordance with implementations of the present disclosure.

FIG. 9 is a flow diagram illustrating an example package delivery system loading process 900, in accordance with implementations of the present disclosure.

The process 900 may begin by determining whether a servo arm is at a loading position, as at 902. For example, a position of the servo arm may be determined based on known movements or actuations of a servo and known relative positions or orientations between the servo arm and the servo. In addition, the servo and the package delivery system may be in an unpowered or off state. Further, a controller may determine whether the servo arm is at the loading position, e.g., based on known movements or actuations of the servo and known relative positions or orientations between the servo arm and the servo.

If it is determined that the servo arm is not at the loading position, then the process 900 may continue by providing power to the package delivery system, as at 904. For example, power may be provided to the servo of the package delivery system by powering on or otherwise activating the package delivery system and/or a vehicle with which the package delivery system is associated. Further, a controller may instruct powering on or activation of the package delivery system and/or vehicle.

Then, the process 900 may proceed by actuating the servo to rotate the servo arm to the loading position, at which a cam follower contacts a foot of a latch, and a slider on a rod contacts a first end stop, as at 906. For example, the servo may rotate the servo arm to the loading position, and the cam follower of the servo arm may contact and rotate the latch to a position at which the cam follower contacts or is adjacent to a foot of the latch. In addition, the rotation of the servo arm may move the rod to a position at which the slider along the second end of the rod contacts or is adjacent to a first end stop at the second end of the rod. Further, a controller may instruct actuation of the servo to rotate the servo arm to the loading position, and thereby cause rotation of the latch and movement of the rod and slider to respective loading positions. The process 900 may then return to step 902 to determine whether the servo arm is at the loading position.

If it is determined at step 902 that the servo arm is at the loading position, then the process 900 may continue to open a package door against a force of a package door tension spring, which moves a slider on the rod toward a second end stop, as at 908. For example, an agent, such as a human or automated agent, may move the door assembly to an open position against a bias force or torque of the door tension spring that may be coupled between the door and a bracket of the package delivery system. Responsive to the door assembly moving to the open position, a slider that is movable along the second end of the rod and pivotably coupled to a portion of the door may move from a position adjacent the first end stop to a position adjacent the second end stop along the second end of the rod, but may not compress a compression spring associated with the second end stop such that the servo may not be backdriven or loaded by the opening force or torque. Further, a controller may instruct movement of the door assembly to the open position.

The process 900 may then proceed to insert a package along a package path, which rotates the latch against a force of a latch tension spring, as at 910. For example, an agent, such as a human or automated agent, may insert the package into the package path of the vehicle. During insertion of the package, a portion of the package may contact a portion of the latch, e.g., a shoulder of the latch, and may rotate the latch out of the package path against a bias force or torque of the latch tension spring that may be coupled between the latch and the bracket of the package delivery system. Further, a controller may instruct insertion of the package along the package path.

The process 900 may continue with fully seating the package at an end of the package path, which allows the latch to rotate responsive to the force of the latch tension spring to again contact the cam follower at the foot of the latch, as at 912. For example, an agent, such as a human or automated agent, may fully insert or seat the package into the package path of the vehicle. Upon fully seating the package, the package may clear the latch, such that the latch may rotate, responsive to the bias force or torque of the latch tension spring, back to a position in which the cam follower contacts the foot of the latch. In addition, a shoulder of the latch may enter a portion of the package path and may hold or maintain the package within the package path. Further, a controller may instruct the full insertion of the package along the package path.

The process 900 may proceed with closing the package door responsive to the force of the package door tension spring, which moves the slider on the rod toward the first end stop, as at 914. For example, an agent, such as a human or automated agent, may release or move the door assembly to the closed position, at least partially with the aid of the bias force or torque of the door tension spring. Responsive to the door assembly moving to the closed position, a slider that is movable along the second end of the rod and pivotably coupled to a portion of the door may move from the position adjacent the second end stop to the position adjacent the first end stop along the second end of the rod. Further, a controller may instruct movement of the door assembly to the closed position. The process 900 may then end, as at 916.

Using the process 900 described herein, responsive to the servo, servo arm, latch, rod, and slider being positioned at respective loading positions, a door assembly may be moved between closed and open positions, and a package may be loaded and held by the movable latch within a package path of a vehicle, substantially without activating or powering on the servo or package delivery system. Accordingly, a vehicle may be loaded with a package for delivery using the package delivery system described herein in a deactivated or powered off state, which may increase safety and efficiency associated with such operations.

Figure 10:
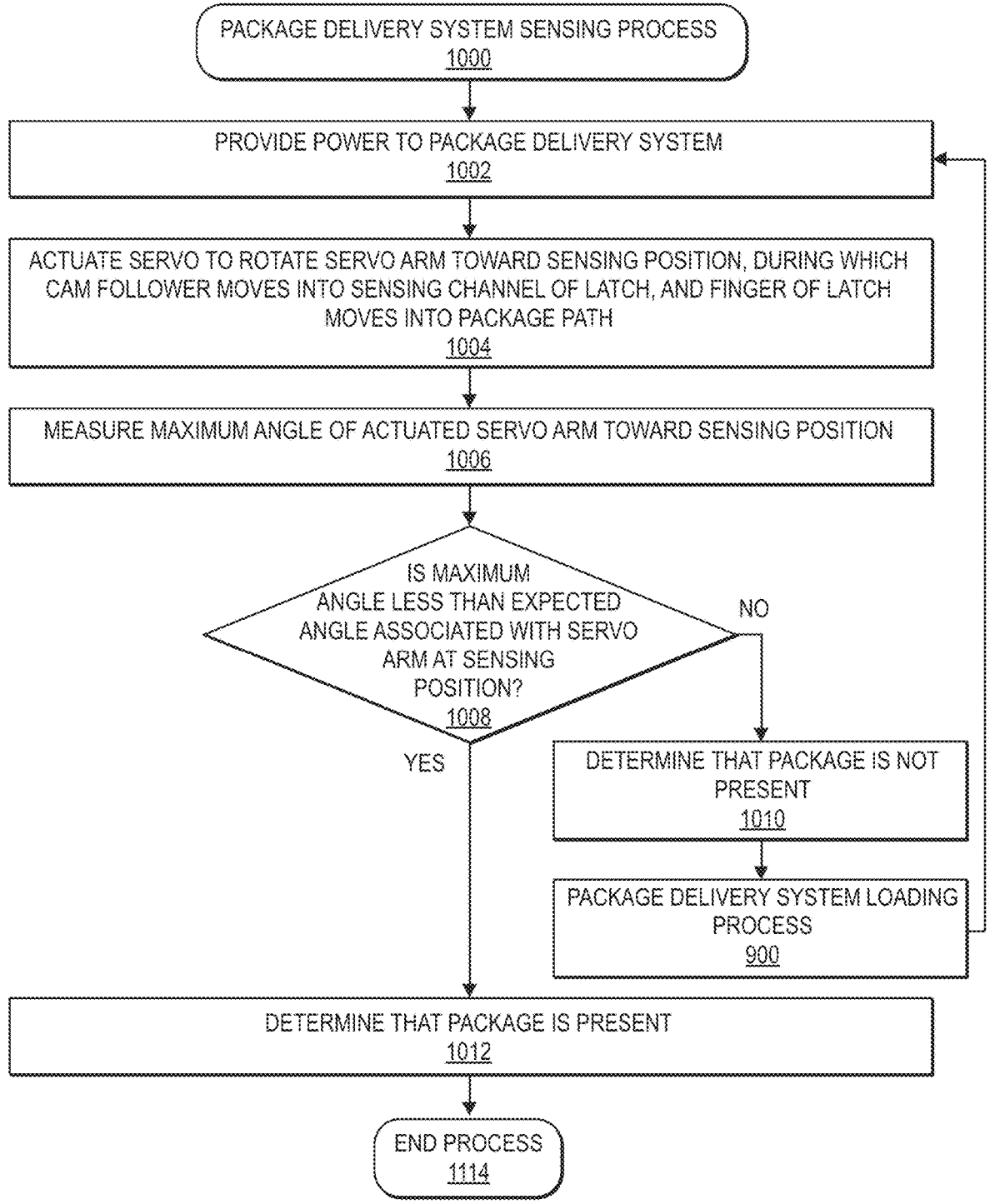
FIG. 10 is a flow diagram illustrating an example package delivery system sensing process, in accordance with implementations of the present disclosure.

FIG. 10 is a flow diagram illustrating an example package delivery system sensing process 1000, in accordance with implementations of the present disclosure.

The process 1000 may begin by providing power to the package delivery system, as at 1002. For example, power may be provided to the servo of the package delivery system by powering on or otherwise activating the package delivery system and/or a vehicle with which the package delivery system is associated. Further, a controller may instruct powering on or activation of the package delivery system and/or vehicle.

The process 1000 may continue by actuating the servo to rotate the servo arm toward the sensing position, during which the cam follower moves into a sensing channel of the latch, and a finger of the latch moves into the package path, as at 1004. For example, the servo may rotate the servo arm toward the sensing position, and the cam follower of the servo arm may contact and move within the channel of the latch from the mouth of the latch toward the terminal end of the channel of the latch. Responsive to the movement of the cam follower within the channel of the latch, the finger of the latch may enter or move into the package path to detect the presence or absence of a package within the package path. Upon the cam follower reaching the terminal end of the channel of the latch or upon contact between the finger of the latch and a portion of a package within the package path that prevents further movement of the servo arm toward the sensing position, the servo may rotate the servo arm back to the locking position. Further, a controller may instruct actuation of the servo to rotate the servo arm toward the sensing position, and thereby cause rotation of the latch to a respective sensing position.

The process 1000 may then proceed by measuring a maximum angle of the actuated servo arm toward the sensing position, as at 1006. For example, a maximum angle of the movement of the servo arm toward the sensing position may be determined or measured based on feedback associated with the servo, e.g., servo angle feedback. If a package is not present within the package path, the servo may rotate the servo arm toward the sensing position such that the cam follower moves within the channel all the way to the terminal end of the channel of the latch. If, however, a package is present within the package path, the servo may rotate the servo arm toward the sensing position until the finger of the latch contacts a portion of the package within the package path and before the cam follower reaches the terminal end of the channel of the latch. Further, a controller may instruct measurement or determination of the maximum angle of the actuated servo arm toward the sensing position.

The process 1000 may then continue to determine whether the maximum angle is less than an expected angle associated with the servo arm at the sensing position, as at 1008. For example, the expected angle associated with the servo arm at the sensing position may be the expected servo angle feedback when the cam follower of the servo arm reaches the terminal end of the channel of the latch. The maximum angle of the determined or measured servo angle feedback may be compared with the expected servo angle feedback associated with the servo arm at the sensing position. Further, a controller may process or compare the maximum angle of the determined or measured servo angle feedback with the expected servo angle feedback associated with the servo arm at the sensing position.

If it is determined that the maximum angle is not less than the expected angle, then the process 1000 may determine that a package is not present within the package path, as at 1010. For example, because the maximum angle is the same as the expected angle, it may be determined that the finger of the latch did not contact any package within the package path before the cam follower of the latch reached the terminal end of the channel of the latch. Further, a controller may determine that a package is not present based on the comparison of the maximum angle and the expected angle. Then, the process 1000 may again perform the package delivery system loading process 900 or portions thereof, as described at least with respect to FIG. 9, to load a package into the vehicle. Thereafter, the process 1000 may then return to step 1002 to perform the package delivery system sensing process again.

If, however, it is determined that the maximum angle is less than the expected angle, then the process 1000 may determine that a package is present within the package path, as at 1012. For example, because the maximum angle is the less than the expected angle, it may be determined that the finger of the latch contacted a package within the package path before the cam follower of the latch reached the terminal end of the channel of the latch. Further, a controller may determine that a package is present based on the comparison of the maximum angle and the expected angle. The process 1000 may then end, as at 1014. Then, the process may proceed to the package delivery system locking process 1100, as described at least with respect to FIGS. 8 and 11, to secure the detected package and the door assembly in the closed position.

Using the process 1000 described herein, a servo may rotate the servo arm toward the sensing position to substantially automatically determine the presence or absence of a package within a package path of a fuselage of a vehicle. Accordingly, the servo of the package delivery system may confirm proper loading of a package within a vehicle before proceeding with subsequent operations of the vehicle, e.g., delivery of the package to a destination.

Figure 11:
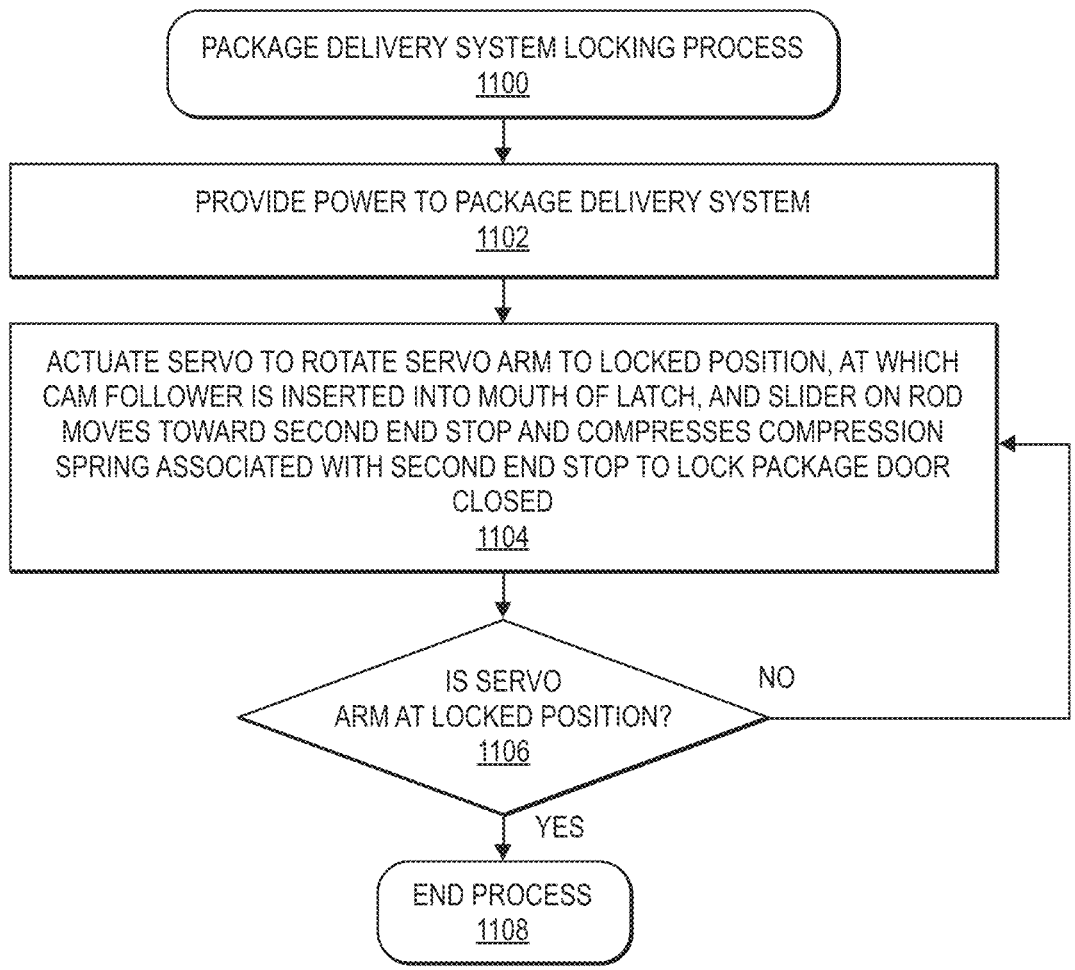
FIG. 11 is a flow diagram illustrating an example package delivery system locking process, in accordance with implementations of the present disclosure.

FIG. 11 is a flow diagram illustrating an example package delivery system locking process 1100, in accordance with implementations of the present disclosure.

The process 1100 may begin by providing power to the package delivery system, as at 1102. For example, power may be provided to the servo of the package delivery system by powering on or otherwise activating the package delivery system and/or a vehicle with which the package delivery system is associated. Further, a controller may instruct powering on or activation of the package delivery system and/or vehicle.

The process 1100 may continue by actuating the servo to rotate the servo arm to the locked position, at which the cam follower is inserted into a mouth of the latch, and the slider on the rod moves toward the second end stop and compresses the compression spring associated with the second end stop to lock the package door closed, as at 1104. For example, the servo may rotate the servo arm to the locking position, and the cam follower of the servo arm may contact and rotate the latch to a position at which the cam follower is positioned within or adjacent to a mouth of the latch, such that a shoulder of the latch may enter a portion of the package path to hold or lock the package within the package path. In addition, the rotation of the servo arm may move the rod to a position at which the slider along the second end of the rod contacts or is adjacent to the second end stop at the second end of the rod, and may compress the compression spring associated with the second end stop, such that the door assembly is held or locked in the closed position. Further, a controller may instruct actuation of the servo to rotate the servo arm to the locking position, and thereby cause rotation of the latch and movement of the rod and slider to respective locking positions.

The process 1100 may proceed by determining whether the servo arm is at the locked position, as at 1106. For example, a position of the servo arm may be determined based on known movements or actuations of a servo and known relative positions or orientations between the servo arm and the servo. Further, a controller may determine whether the servo arm is at the locking position, e.g., based on known movements or actuations of the servo and known relative positions or orientations between the servo arm and the servo.

If it is determined that the servo arm is not at the locking position, then the process 1100 may return to step 1104 to continue to actuate the servo to rotate the servo arm to the locking position. If, however, it is determined at step 1106 that the servo arm is at the locking position, then the process 1100 may end, as at 1108.

Using the process 1100 described herein, a single servo may rotate the servo arm to the locking position, thereby moving the latch to a locking position to hold or lock the package within the package path, and also moving the rod and slider to a locking position to hold or lock the door assembly in the closed position. Accordingly, the single servo of the package delivery system may concurrently secure a package within a vehicle and also secure the door assembly of the vehicle in the closed position.

Figure 12A:
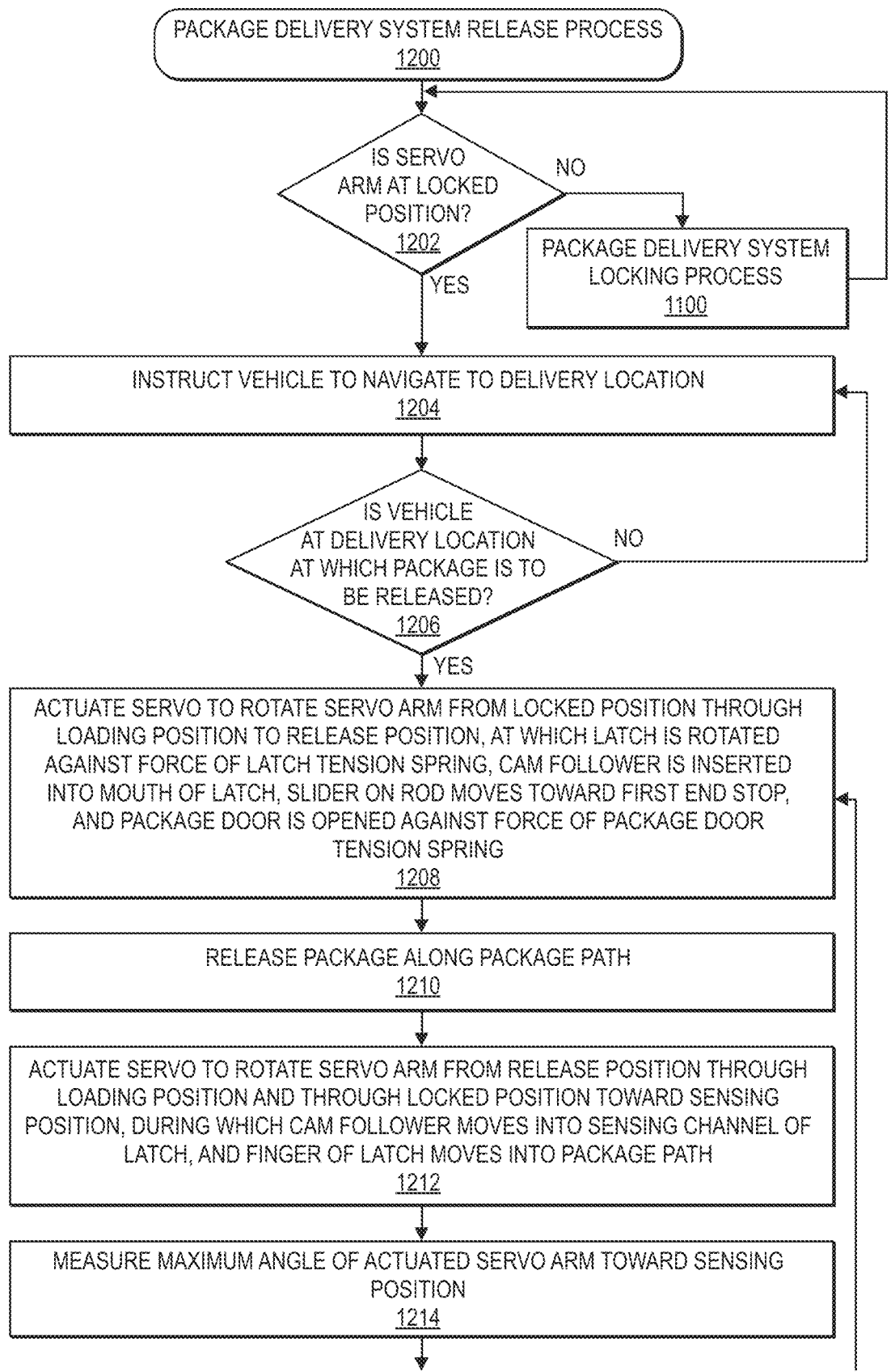
FIGS. 12A-12B is a flow diagram illustrating an example package delivery system release process, in accordance with implementations of the present disclosure.
Figure 12B:
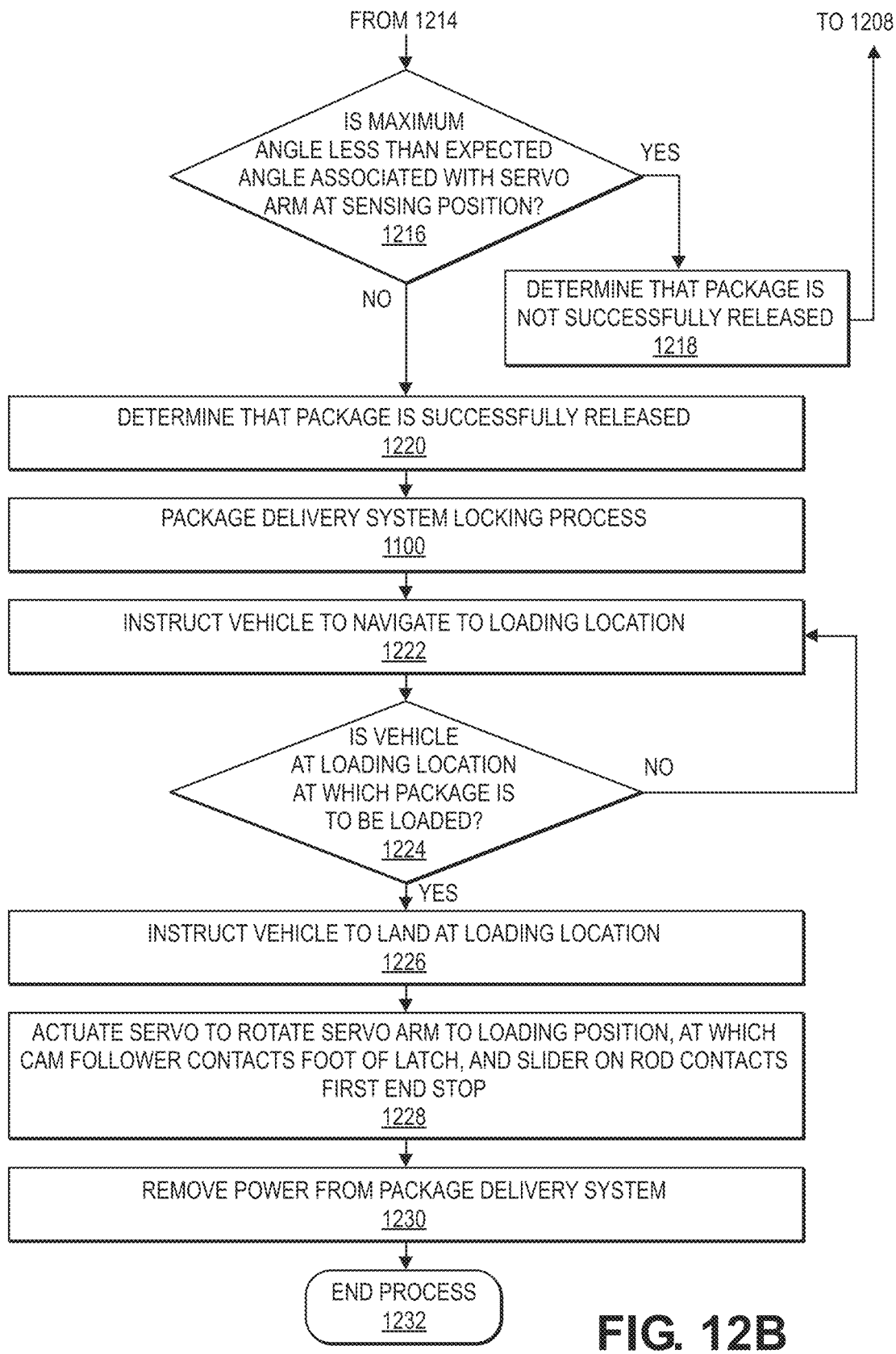

FIGS. 12A-12B is a flow diagram illustrating an example package delivery system release process 1200, in accordance with implementations of the present disclosure.

The process 1200 may begin by determining whether the servo arm is at the locked position, as at 1202. For example, a position of the servo arm may be determined based on known movements or actuations of a servo and known relative positions or orientations between the servo arm and the servo. Further, a controller may determine whether the servo arm is at the locking position, e.g., based on known movements or actuations of the servo and known relative positions or orientations between the servo arm and the servo.

If it is determined that the servo arm is not at the locking position, then the process 1200 may perform the package delivery system locking process 1100, as described at least with respect to FIG. 11, to secure a package within the package path and to secure a door assembly in the closed position. Thereafter, the process 1200 may return to step 1202 to determine whether the servo arm is at the locking position again.

If it is determined that the servo arm is at the locking position, then the process 1200 may continue by instructing the vehicle to navigate to a delivery location, as at 1204. For example, the vehicle may receive or determine a flight plan, directions, or other information associated with delivery of a package to the delivery location. Further, a controller may instruct various components of the vehicle to control operations and navigation of the vehicle to the delivery location.

The process 1200 may then proceed by determining whether the vehicle is at the delivery location at which the package is to be released, as at 1206. For example, the vehicle may determine its position and orientation during navigation to the delivery location, e.g., using global positioning sensors (GPS), accelerometers, gyroscopes, or other location or navigation sensors. Further, a controller may determine whether the vehicle is at the delivery location based on various data received from sensors associated with the vehicle and/or the delivery location. If it is determined that the vehicle is not at the delivery location, the process 1200 may return to step 1204 to continue to instruct the vehicle to navigate to the delivery location.

If, however, it is determined that the vehicle is at the delivery location, then the process 1200 may continue to actuate the servo to rotate the servo arm from the locked position through the loading position and to the release position, at which the latch is rotated against the force of the latch tension spring, the cam follower is inserted into the mouth of the latch, the slider on the rod moves toward the first end stop, and the package door is opened against the force of the package door tension spring, as at 1208. For example, the servo may rotate the servo arm toward the release position, and the cam follower of the servo arm may contact and rotate the latch to a position at which the cam follower is positioned within or adjacent to the mouth of the latch, such that no portion of the latch is blocking or obstructing the package path. In addition, the rotation of the servo arm may move the rod to a position at which the slider along the second end of the rod contacts or is adjacent to the first end stop at the second end of the rod. Moreover, due to further movement of the rod, the first end stop may push the slider, such that the door assembly to which the slider is coupled via the slider connection may be moved to and held in the open position against the bias force or torque of the door tension spring. Further, a controller may instruct actuation of the servo to rotate the servo arm to the release position, and thereby cause rotation of the latch and movement of the rod and slider to respective release positions.

The process 1200 may then proceed to release the package along the package path, as at 1210. For example, responsive to the latch rotating to a respective release position in which no portion of the latch blocks or obstructs the package path, and responsive to the rod and slider moving and holding the door assembly in the open position, the package may be released from the vehicle via the package path. In some example embodiments, the vehicle may be airborne during release of the package, e.g., two feet, four feet, six feet, one meter, two meters, or other distances above ground. In other example embodiments, the vehicle may be on the ground and/or landed during release of the package, if sufficient clearance is available between the ground, the door assembly in the open position, the released package, and/or other portions of the vehicle. Further, a controller may instruct release of the package from within the package path of the vehicle.

The process 1200 may continue with actuating the servo to rotate the servo arm from the release position through the loading position and the locking position toward the sensing position, during which the cam follower moves into the sensing channel of the latch, and the finger of the latch moves into the package path, as at 1212. For example, the servo may rotate the servo arm toward the sensing position, and the cam follower of the servo arm may contact and move within the channel of the latch from the mouth of the latch toward the terminal end of the channel of the latch. Responsive to the movement of the cam follower within the channel of the latch, the finger of the latch may enter or move into the package path to detect the presence or absence of a package within the package path. Upon the cam follower reaching the terminal end of the channel of the latch or upon contact between the finger of the latch and a portion of a package within the package path that prevents further movement of the servo arm toward the sensing position, the servo may rotate the servo arm back to the locking position. Further, a controller may instruct actuation of the servo to rotate the servo arm toward the sensing position, and thereby cause rotation of the latch to a respective sensing position.

The process 1200 may then proceed with measuring a maximum angle of the actuated servo arm toward the sensing position, as at 1214. For example, a maximum angle of the movement of the servo arm toward the sensing position may be determined or measured based on feedback associated with the servo, e.g., servo angle feedback. If a package is not present within the package path, the servo may rotate the servo arm toward the sensing position such that the cam follower moves within the channel all the way to the terminal end of the channel of the latch. If, however, a package is present within the package path, the servo may rotate the servo arm toward the sensing position until the finger of the latch contacts a portion of the package within the package path and before the cam follower reaches the terminal end of the channel of the latch. Further, a controller may instruct measurement or determination of the maximum angle of the actuated servo arm toward the sensing position.

The process 1200 may then continue to determine whether the maximum angle is less than an expected angle associated with the servo arm at the sensing position, as at 1216. For example, the expected angle associated with the servo arm at the sensing position may be the expected servo angle feedback when the cam follower of the servo arm reaches the terminal end of the channel of the latch. The maximum angle of the determined or measured servo angle feedback may be compared with the expected servo angle feedback associated with the servo arm at the sensing position. Further, a controller may process or compare the maximum angle of the determined or measured servo angle feedback with the expected servo angle feedback associated with the servo arm at the sensing position.

If it is determined that the maximum angle is less than the expected angle, then the process 1200 may determine that the package was not successfully released, as at 1218. For example, because the maximum angle is the less than the expected angle, it may be determined that the finger of the latch contacted a package within the package path before the cam follower of the latch reached the terminal end of the channel of the latch. Further, a controller may determine that a package is still present and that the release was not successful based on the comparison of the maximum angle and the expected angle. Then, the process 1200 may return to step 1208 to actuate the servo to rotate the servo arm to the release position again.

If, however, it is determined that the maximum angle is not less than the expected angle, then the process 1200 may determine that the package was successfully released, as at 1220. For example, because the maximum angle is the same as the expected angle, it may be determined that the finger of the latch did not contact any package within the package path before the cam follower of the latch reached the terminal end of the channel of the latch. Further, a controller may determine that a package is not present and that the release was successful based on the comparison of the maximum angle and the expected angle.

Then, the process 1200 may perform the package delivery system locking process 1100, as described at least with respect to FIG. 11, to secure the door assembly in the closed position.

The process 1200 may then proceed to instruct the vehicle to navigate to a loading location, as at 1222. For example, the vehicle may receive or determine a flight plan, directions, or other information associated with navigation to the loading location. Further, a controller may instruct various components of the vehicle to control operations and navigation of the vehicle to the loading location.

The process 1200 may then continue with determining whether the vehicle is at the loading location at which a package is to be loaded, as at 1224. For example, the vehicle may determine its position and orientation during navigation to the loading location, e.g., using global positioning sensors (GPS), accelerometers, gyroscopes, or other location or navigation sensors. Further, a controller may determine whether the vehicle is at the loading location based on various data received from sensors associated with the vehicle and/or the loading location. If it is determined that the vehicle is not at the loading location, the process 1200 may return to step 1222 to continue to instruct the vehicle to navigate to the loading location.

If, however, it is determined that the vehicle is at the loading location, then the process 1200 may proceed with instructing the vehicle to land at the loading location, as at 1226. For example, the vehicle may receive or determine a flight plan, directions, or other information associated with landing at the loading location, e.g., at a particular landing pad, loading location, storage location, maintenance location, or other location. Further, a controller may instruct various components of the vehicle to control operations and navigation of the vehicle to land at the loading location.

The process 1200 may then continue by actuating the servo to rotate the servo arm to the loading position, at which a cam follower contacts the foot of the latch, and the slider on the rod contacts the first end stop, as at 1228. For example, the servo may rotate the servo arm to the loading position, and the cam follower of the servo arm may contact and rotate the latch to a position at which the cam follower contacts or is adjacent to a foot of the latch. In addition, the rotation of the servo arm may move the rod to a position at which the slider along the second end of the rod contacts or is adjacent to a first end stop at the second end of the rod. Further, a controller may instruct actuation of the servo to rotate the servo arm to the loading position, and thereby cause rotation of the latch and movement of the rod and slider to respective loading positions.

The process 1200 may proceed by removing power from the package delivery system, as at 1230. For example, responsive to actuating the servo to rotate the servo arm to the loading position, the vehicle and/or the package delivery system may be deactivated or powered off such that the servo may not be actuated. Further, a controller may instruct deactivation or powering off of the vehicle and/or package delivery system. The process 1200 may then end, as at 1232. As described herein at least with respect to FIG. 9, a subsequent package may then be loaded to the vehicle in the deactivated or powered off state.

Using the process 1200 described herein, a single servo may rotate the servo arm to the release position, thereby moving the latch to a release position to release the package from within the package path, and also moving the rod and slider to a release position to hold or lock the door assembly in the open position. Accordingly, the single servo of the package delivery system may concurrently release a package from within a vehicle and also secure the door assembly of the vehicle in the open position. Furthermore, after release of the package by the package delivery system, a servo may rotate the servo arm toward the sensing position to substantially automatically determine the presence or absence of a package. Accordingly, the servo of the package delivery system may confirm successful release of a package from within a vehicle before proceeding with subsequent operations of the vehicle, e.g., navigation of the vehicle away from the delivery location. Moreover, by actuating the servo, servo arm, latch, rod, and slider to respective loading positions and then powering off the package delivery system, a door assembly may be moved between closed and open positions, and a package may be loaded and held by the movable latch within a package path of a vehicle, substantially without activating or powering on the servo or package delivery system. Accordingly, a vehicle may be loaded with a package for delivery using the package delivery system described herein in a deactivated or powered off state, which may increase safety and efficiency associated with such operations.

Figure 13:
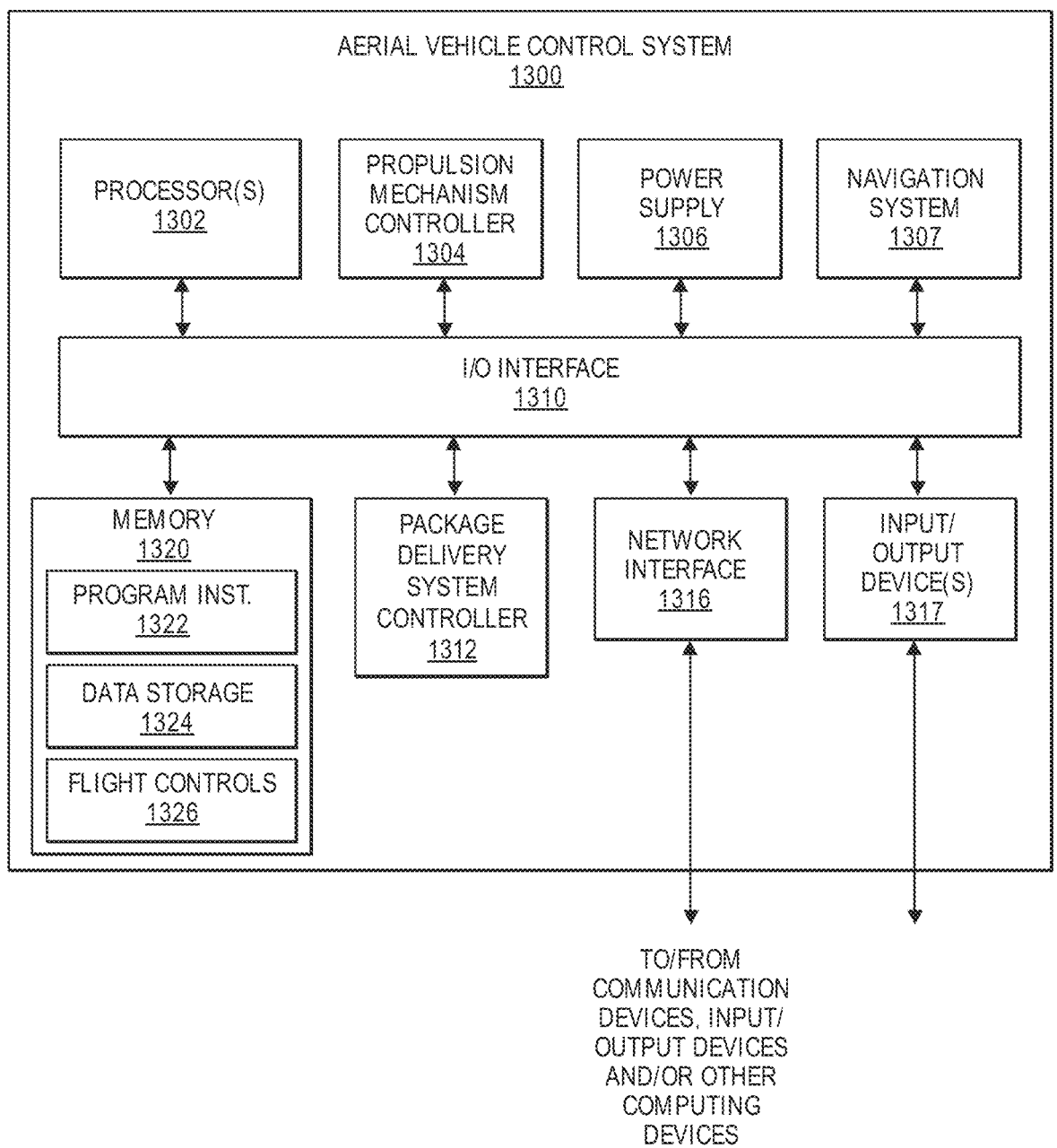
FIG. 13 is a block diagram illustrating various components of an example aerial vehicle control system, in accordance with implementations of the present disclosure.

FIG. 13 is a block diagram illustrating various components of an example aerial vehicle control system or controller 1300, in accordance with implementations of the present disclosure.

In various examples, the block diagram may be illustrative of one or more aspects of the aerial vehicle control system 1300 that may be used to implement the various systems and processes discussed above. In the illustrated implementation, the aerial vehicle control system 1300 includes one or more processors 1302, coupled to a non-transitory computer readable storage medium 1320 via an input/output (I/O) interface 1310. The aerial vehicle control system 1300 may also include a propulsion controller 1304, a power supply or battery 1306, and/or a navigation system 1307. The aerial vehicle control system 1300 may further include a package delivery system controller 1312, a network interface 1316, and one or more input/output devices 1317.

In various implementations, the aerial vehicle control system 1300 may be a uniprocessor system including one processor 1302, or a multiprocessor system including several processors 1302 (e.g., two, four, eight, or another suitable number). The processor(s) 1302 may be any suitable processor capable of executing instructions. For example, in various implementations, the processor(s) 1302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1302 may commonly, but not necessarily, implement the same ISA.

The non-transitory computer readable storage medium 1320 may be configured to store executable instructions, data, and package delivery system or apparatus data and/or characteristics, including door assembly data, servo data, servo arm data, latch data, rod data, slider data, spring data, package path data, package data, vehicle data, flight data, navigation data, and/or other data items accessible by the processor(s) 1302. In various implementations, the non-transitory computer readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1320 as program instructions 1322, data storage 1324 and flight controls 1326, respectively. In other implementations, program instructions, data and/or package delivery system or apparatus data may be received, sent or stored upon different types of computer-accessible media, such as non-transitory media, or on similar media separate from the non-transitory computer readable storage medium 1320 or the aerial vehicle control system 1300.

Generally, a non-transitory, computer readable storage medium may include storage media or memory media such as magnetic or optical media, e.g., disk or CD/DVD-ROM, coupled to the aerial vehicle control system 1300 via the I/O interface 1310. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1316.

In one implementation, the I/O interface 1310 may be configured to coordinate I/O traffic between the processor(s) 1302, the non-transitory computer readable storage medium 1320, and any peripheral devices, the network interface 1316 or other peripheral interfaces, such as input/output devices 1317. In some implementations, the I/O interface 1310 may perform any necessary protocol, timing or other data transformations to convert data signals from one component (e.g., non-transitory computer readable storage medium 1320) into a format suitable for use by another component (e.g., processor(s) 1302). In some implementations, the I/O interface 1310 may include support for devices attached through various types of peripheral buses, such as a variant of the Peripheral Component Interconnect (PCI) bus standard or the Universal Serial Bus (USB) standard, for example. In some implementations, the function of the I/O interface 1310 may be split into two or more separate components, such as a north bridge and a south bridge, for example. Also, in some implementations, some or all of the functionality of the I/O interface 1310, such as an interface to the non-transitory computer readable storage medium 1320, may be incorporated directly into the processor(s) 1302.

The propulsion controller 1304 communicates with the navigation system 1307 and adjusts the operational characteristics of each propulsion mechanism to guide the aerial vehicle along a determined path and/or to perform other navigational maneuvers. The navigation system 1307 may include a GPS, other sensors, or other similar systems than can be used to navigate the aerial vehicle to and/or from a location.

The aerial vehicle control system 1300 may also include a package delivery system controller 1312 that communicates with the processor(s) 1302, the power supply 1306, the navigation system 1307, the non-transitory computer readable storage medium 1320, and/or other components or elements described herein to activate or deactivate the package delivery apparatus, move or rotate components of the package delivery apparatus between loading positions, locking positions, sensing positions, and release positions, load, lock, sense, and release packages relative to package paths, and/or move package door assemblies between open and closed positions.

The network interface 1316 may be configured to allow data to be exchanged between the aerial vehicle control system 1300, other devices attached to a network, such as other computer systems, and/or control systems of other vehicles, systems, machines, equipment, apparatuses, systems, devices, and/or delivery or loading locations. For example, the network interface 1316 may enable wireless communication between numerous vehicles, such as aerial vehicles, ground based vehicles, water based vehicles, or other types of vehicles. In various implementations, the network interface 1316 may support communication via wireless general data networks, such as a Wi-Fi network. For example, the network interface 1316 may support communication via telecommunications networks such as cellular communication networks, satellite networks, and the like.

Input/output devices 1317 may, in some implementations, include one or more displays, imaging sensors, image capture devices, thermal sensors, infrared sensors, time of flight sensors, accelerometers, gyroscopes, pressure sensors, weather sensors, various other sensors described herein, etc. Multiple input/output devices 1317 may be present and controlled by the aerial vehicle control system 1300. One or more of these sensors may be utilized to assist in performing the various functions, operations, and processes described herein.

As shown in FIG. 13, the memory may include program instructions 1322 which may be configured to implement the example processes and/or sub-processes described above. The data storage 1324 may include various data stores for maintaining data items that may be provided for performing the various functions, operations, and processes described herein. For example, the data storage 1324 may include package delivery system or apparatus data and/or characteristics, including door assembly data, servo data, servo arm data, latch data, rod data, slider data, spring data, package path data, package data, vehicle data, flight data, navigation data, and/or other data items.

Those skilled in the art will appreciate that the aerial vehicle control system 1300 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The aerial vehicle control system 1300 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to aerial vehicles, the disclosed implementations may also be used for other forms of vehicles, including, but not limited to, ground based vehicles and water based vehicles.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 8-12B, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A vehicle, comprising:
a fuselage;
at least one propulsion mechanism coupled to the fuselage; and
a package delivery apparatus associated with a portion of the fuselage, the package delivery apparatus including:
a package door hingedly coupled to the fuselage;
a bracket coupled to an interior of the fuselage;
an actuator coupled to the bracket;
a servo arm coupled to and rotated by the actuator;
a latch rotatably coupled to the bracket and configured to move between a plurality of positions responsive to rotation of the servo arm; and
a rod pivotably coupled at a first end to the servo arm and pivotably coupled at a second end to the package door, the package door configured to move between an open position and a closed position responsive to movement of the rod by the servo arm.

2. The vehicle of claim 1, wherein the servo arm includes a cam follower configured to contact portions of the latch to rotate the latch between the plurality of positions.

3. The vehicle of claim 1, wherein the plurality of positions of the latch includes a loading position, a locking position, a sensing position, and a release position.

4. The vehicle of claim 1, wherein the latch is biased to rotate in a first direction by a first tension spring coupled between the latch and the bracket; and
wherein the package door is biased to the closed position by a second tension spring coupled between the package door and the bracket.

5. The vehicle of claim 1, wherein the package delivery apparatus is configured to release a package from the vehicle during VTOL flight of the vehicle.

6. A package delivery apparatus, comprising:
a servo arm coupled to and rotated by an actuator, the actuator being coupled to a bracket that is coupled to a portion of a vehicle;
a latch rotatably coupled to the bracket and configured to move between a plurality of positions responsive to rotation of the servo arm; and
a rod pivotably coupled at a first end to the servo arm and pivotably coupled at a second end to a door of the vehicle, the door configured to move between an open position and a closed position responsive to movement of the rod by the servo arm.

7. The package delivery apparatus of claim 6, wherein the servo arm includes a cam follower configured to contact portions of the latch to rotate the latch between the plurality of positions.

8. The package delivery apparatus of claim 7, wherein the latch includes a plurality of portions including a shoulder, a foot, a mouth, a channel, and a finger.

9. The package delivery apparatus of claim 8, wherein the latch is biased to rotate in a first direction by a first tension spring coupled between the latch and the bracket.

10. The package delivery apparatus of claim 9, wherein the rod includes a slider movably coupled to the second end of the rod, and the slider is pivotably coupled to the door to move the door between the open position and the closed position responsive to movement of the rod by the servo arm.

11. The package delivery apparatus of claim 10, wherein the rod includes a first end stop and a second end stop, the second end stop including a compression spring; and
wherein the slider moves along the second end of the rod between the first end stop and the second end stop.

12. The package delivery apparatus of claim 11, wherein the door is biased to the closed position by a second tension spring coupled between the door and the bracket.

13. The package delivery apparatus of claim 12, wherein in a loading position of the plurality of positions:
the cam follower of the servo arm contacts the foot of the latch;
the shoulder of the latch obstructs a package path;
the latch is rotatable in a second direction opposite the first direction responsive to contact between the shoulder of the latch and a package loaded via the package path;
the slider is positioned adjacent the first end stop such that the door is in the closed position; and
the slider is movable toward the second end stop responsive to a force moving the door to the open position.

14. The package delivery apparatus of claim 12, wherein in a locking position of the plurality of positions:
the cam follower of the servo arm contacts the mouth of the latch;
the shoulder of the latch obstructs a package path; and
the slider is positioned adjacent the second end stop such that the door is held in the closed position.

15. The package delivery apparatus of claim 12, wherein in a sensing position of the plurality of positions:
the cam follower of the servo arm contacts at least a portion of the channel of the latch;
the latch is rotated in the first direction toward the sensing position by the cam follower such that the finger of the latch enters a package path; and
the slider is positioned adjacent the second end stop such that the door is held in the closed position.

16. The package delivery apparatus of claim 12, wherein in a release position of the plurality of positions:
the cam follower of the servo arm contacts the mouth of the latch;
the latch is rotated in a second direction opposite the first direction by the cam follower such that the package path is unobstructed by the latch; and
the slider is positioned adjacent the first end stop such that the door is held in the open position against a bias force of the second tension spring.

17. A method of operating a package delivery apparatus of a vehicle, comprising:
instructing an actuator to rotate a servo arm and a latch to a loading position, the servo arm being coupled to and rotated by the actuator, the actuator being coupled to a bracket that is coupled to a portion of the vehicle, and the latch being rotatably coupled to the bracket and configured to move responsive to rotation of the servo arm;
wherein the rotation of the servo arm to the loading position further moves a rod to permit movement of a door of the vehicle between an open position and a closed position, the rod being pivotably coupled at a first end to the servo arm and pivotably coupled via a movable slider at a second end to the door;
wherein in the loading position:
a cam follower of the servo arm contacts a foot of the latch;
a shoulder of the latch movably obstructs a package path; and the movable slider is movable between a first end stop at which the door is in the closed position and a second end stop at which the door is in the open position.

18. The method of operating the package delivery apparatus of the vehicle of claim 17, further comprising:
   instructing the actuator to rotate the servo arm and the latch to a sensing position;
   wherein the rotation of the servo arm to the sensing position further moves the rod to hold the door of the vehicle in the closed position;
   wherein in the sensing position:
      the cam follower of the servo arm contacts at least a portion of a channel of the latch;
      a finger of the latch enters the package path; and
      the movable slider is positioned adjacent the second end stop such that the door is held in the closed position.

19. The method of operating the package delivery apparatus of the vehicle of claim 18, further comprising:
   instructing the actuator to rotate the servo arm and the latch to a locking position;
   wherein the rotation of the servo arm to the locking position further moves the rod to hold the door of the vehicle in the closed position;
   wherein in the locking position:
      the cam follower of the servo arm contacts a mouth of the latch;
      the shoulder of the latch obstructs the package path; and
      the movable slider is positioned adjacent the second end stop such that the door is held in the closed position.

20. The method of operating the package delivery apparatus of the vehicle of claim 19, further comprising:
   instructing the actuator to rotate the servo arm and the latch to a release position;
   wherein the rotation of the servo arm to the release position further moves the rod to hold the door of the vehicle in the open position;
   wherein in the release position:
      the cam follower of the servo arm contacts a mouth of the latch;
      the package path is unobstructed by the latch; and
      the movable slider is positioned adjacent the first end stop such that the door is held in the open position.

* * * * *